United States Patent
Lee et al.

(10) Patent No.: US 10,268,308 B2
(45) Date of Patent: Apr. 23, 2019

(54) INPUT PROCESSING METHOD AND DEVICE

(71) Applicant: Samsung Electronics Co., Ltd., Gyeonggi-do (KR)

(72) Inventors: Sung Jun Lee, Gyeonggi-do (KR); Jae Min Lee, Gyeonggi-do (KR); Seung Jin Kim, Gyeonggi-do (KR); Jun Ik Lee, Gyeonggi-do (KR); Ki Won Kim, Gyeonggi-do (KR); Young Mok Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 83 days.

(21) Appl. No.: 15/343,897

(22) Filed: Nov. 4, 2016

(65) Prior Publication Data
US 2017/0131832 A1 May 11, 2017

(30) Foreign Application Priority Data
Nov. 6, 2015 (KR) .................. 10-2015-0156169

(51) Int. Cl.
*G06F 3/041* (2006.01)
*G06F 3/044* (2006.01)
*G06F 3/0488* (2013.01)

(52) U.S. Cl.
CPC ............ *G06F 3/0416* (2013.01); *G06F 3/044* (2013.01); *G06F 3/0412* (2013.01); *G06F 3/0418* (2013.01); *G06F 3/0488* (2013.01)

(58) Field of Classification Search
CPC ...... G06F 3/0412; G06F 3/0416; G06F 3/044; G06F 3/0488; G06F 3/41
See application file for complete search history.

(56) References Cited

U.S. PATENT DOCUMENTS

| 6,255,604 | B1 * | 7/2001 | Tokioka | G06F 3/045 178/18.01 |
| 6,958,749 | B1 * | 10/2005 | Matsushita | G06F 3/0416 178/18.03 |
| 8,004,497 | B2 | 8/2011 | XiaoPing | |

(Continued)

FOREIGN PATENT DOCUMENTS

| EP | 2 677 413 | 12/2013 |
| KR | 1020130104012 | 9/2013 |
| KR | 1020150022202 | 3/2015 |

OTHER PUBLICATIONS

International Search Report dated Jan. 25, 2017 issued in counterpart application No. PCT/KR2016/012085, 12 pages.

(Continued)

*Primary Examiner* — Vijay Shankar
(74) *Attorney, Agent, or Firm* — The Farrell Law Firm, P.C.

(57) ABSTRACT

An electronic device is provided. The electronic device includes an input panel configured to periodically sense touch coordinates corresponding to a touch manipulation of a user; and a processor configured to periodically receive the touch coordinates from the input panel, calculate a variation of the touch coordinates based on the touch coordinates, change a reference value for determining movement of the touch manipulation based on the variation of the touch coordinates, and determine whether the touch manipulation moves, based on the reference value.

20 Claims, 12 Drawing Sheets

(56) References Cited

U.S. PATENT DOCUMENTS

| | | | |
|---|---|---|---|
| 8,174,507 B2 | 5/2012 | XiaoPing | |
| 8,519,973 B1 | 8/2013 | XiaoPing | |
| 8,773,396 B1 | 7/2014 | Ksondzyk et al. | |
| 9,588,607 B2 | 3/2017 | Kim | |
| 2003/0063073 A1* | 4/2003 | Geaghan | G06F 3/0416 345/173 |
| 2005/0046621 A1 | 3/2005 | Kaikuranta | |
| 2007/0268265 A1 | 11/2007 | XiaoPing | |
| 2010/0259499 A1 | 10/2010 | Kaikuranta et al. | |
| 2010/0315366 A1 | 12/2010 | Lee et al. | |
| 2011/0050638 A1 | 3/2011 | Lee | |
| 2012/0044201 A1 | 2/2012 | XiaoPing | |
| 2012/0169619 A1 | 7/2012 | Golovchenko | |
| 2013/0235008 A1 | 9/2013 | Kwon | |
| 2013/0342485 A1 | 12/2013 | Kim | |
| 2015/0054767 A1 | 2/2015 | Lim et al. | |
| 2015/0177980 A1 | 6/2015 | Yanase et al. | |

OTHER PUBLICATIONS

European Search Report dated Aug. 29, 2018 issued in counterpart application No. 16862336.1-1231, 11 pages.

* cited by examiner

INPUT PROCESSING METHOD AND DEVICE

PRIORITY

This application claims priority under 35 U.S.C. § 119(a) to a Korean Patent Application filed on Nov. 6, 2015 in the Korean Intellectual Property Office and assigned Serial number 10-2015-0156169, the entire disclosure of which is incorporated herein by reference.

BACKGROUND

1. Field of the Disclosure

The present disclosure relates generally to a method and device for processing a touch input, and more particularly, to a method and device for processing a touch input to improve a reaction speed or accuracy of a touch manipulation.

2. Description of the Related Art

With the development of electronic technologies, various types of electronic devices are being developed and supplied. In recent years, portable electronic devices, which have a variety of functions, such as a smart phone, a tablet personal computer (PC), and the like are widely used.

Most electronic devices that were recently developed have used a touch panel (or a pen sensor panel) as an input device. In particular, a user may intuitively input a user manipulation to a touch screen combined with a display.

A touch screen (e.g., a touch panel (or a pen sensor panel)) included in a display may have a reduced reaction speed or reduced accuracy of a touch manipulation based on a processing time or a processing method of a touch movement of a user.

SUMMARY

An aspect of the present disclosure is to provide an input processing method and device capable of improving the reaction speed or the accuracy of a touch manipulation.

In accordance with an aspect of the present disclosure, an electronic device is provided. The electronic device includes an input panel configured to periodically sense touch coordinates corresponding to a touch manipulation of a user; and a processor configured to periodically receive the touch coordinates from the input panel, calculate a variation of the touch coordinates based on the touch coordinates, change a reference value for determining movement of the touch manipulation based on the variation of the touch coordinates, and determine whether the touch manipulation moves, based on the reference value.

In accordance with another aspect of the present disclosure, an electronic device is provided. The electronic device includes a display, an input panel configured to periodically sense touch coordinates corresponding to a touch manipulation of a user, and a processor configured to periodically receive the touch coordinates from the input panel, calculate a variation of the touch coordinates based on the touch coordinates, determine resampling coordinates of the touch coordinates based on an update period of the display, determine whether the touch manipulation moves, based on the variation of the touch coordinates, and perform a function corresponding to the determination whether the touch manipulation moves based on the resampling coordinates.

In accordance with another aspect of the present disclosure, an input processing method of an electronic device is provided. The method includes periodically sensing touch coordinates corresponding to a touch manipulation of a user, calculating a variation of the touch coordinates based on the touch coordinates, changing a reference value for determining movement of the touch manipulation by using the variation of the touch coordinates, and determining whether the touch manipulation moves, based on the reference value.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION OF EMBODIMENTS OF THE PRESENT DISCLOSURE

Figure 1:
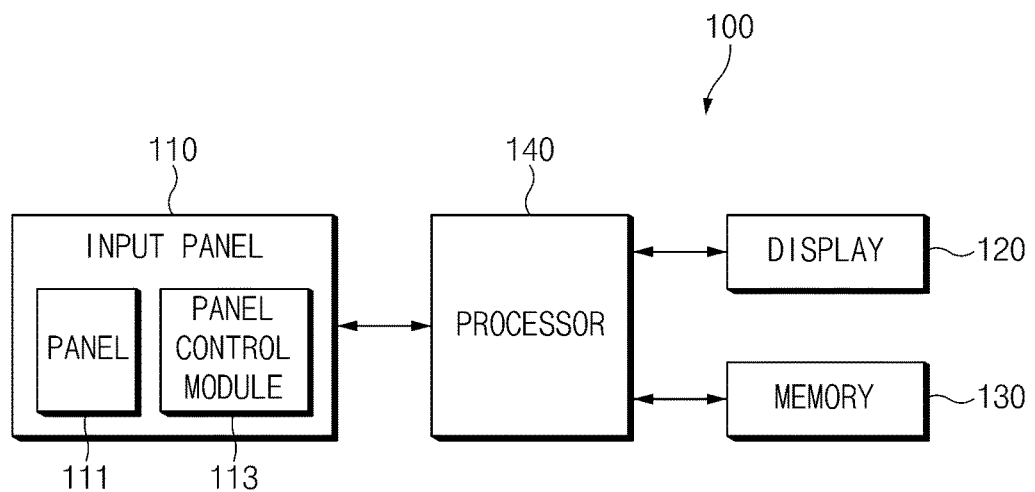
FIG. 1 is a block diagram of an electronic device, according to an embodiment of the present disclosure.

Various embodiments of the present disclosure may be described with reference to the accompanying drawings. Accordingly, those of ordinary skill in the art will recognize that a modification, an equivalent, and/or an alternative on the various embodiments of the present disclosure described herein may be variously made without departing from the scope and spirit of the present disclosure. With regard to the description below of the accompanying drawings, similar elements may be marked by similar reference numerals.

In the present disclosure, the expressions "have," "may have," "include," "comprise," "may include," and "may comprise" used herein indicate the existence of corresponding features (e.g., elements such as numeric values, functions, operations, or components) but do not exclude the presence of additional features.

In the present disclosure, the expressions "A or B," "at least one of A and/or B," "one or more of A and/or B," and the like used herein may include any and all combinations of one or more of the associated listed items. For example, the terms "A or B," "at least one of A and B," and "at least one of A or B" may refer to all of case (1) where at least one A is included, case (2) where at least one B is included, and case (3) where both of at least one A and at least one B are included.

The terms "first," "second," and the like used herein may refer to various elements of various embodiments of the present disclosure, but do not limit the elements. For example, "a first user device" and "a second user device" may indicate different user devices regardless of the order or priority thereof. For example, without departing from the scope of the present disclosure, a first element may be referred to as a second element, and similarly, a second element may be referred to as a first element.

When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for," "having the size to," "designed to," "adapted to," "made to," or "capable of." The term "configured to" must not indicate only "specifically designed to" in hardware. Instead, the expression "a device configured to" may indicate that the device is "capable of" operating together with another device or other components. For example, a "processor configured to (or set to) perform A, B, and C" may indicate a dedicated processor (e.g., an embedded processor) for performing a corresponding operation or a general purpose processor (e.g., a central processing unit (CPU) or an application processor) which performs corresponding operations by executing one or more software programs which are stored in a memory device.

Terms used in the present disclosure are used to describe certain embodiments but are not intended to limit the scope of the present disclosure. The terms of a singular form may include plural forms unless otherwise specified.

All the terms used herein, may have the same meanings that are generally understood by a person skilled in the art. Terms, which are defined in a dictionary and commonly used, should also be interpreted as is customary in the relevant related art and not in an idealized or overly formal way unless expressly so defined herein in various embodiments of the present disclosure. In some cases, even if terms are terms which are defined in the present disclosure, they may not be interpreted to exclude embodiments of the present disclosure.

For example, an electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, and wearable devices. According to various embodiments of the present disclosure, a wearable device may include at least one of an accessory type of a device (e.g., a timepiece, a ring, a bracelet, an anklet, a necklace, glasses, a contact lens, or a head-mounted-device (HMD)), a one-piece fabric or a clothes type of a device (e.g., electronic clothes), a body-attached type of a device (e.g., a skin pad or a tattoo), and a bio-implantable type of a device (e.g., an implantable circuit).

In an embodiment of the present disclosure, an electronic device may be a home appliance. A home appliance may include at least one of, for example, a television (TV), a digital versatile disc (DVD) player, an audio player, a refrigerator, an air conditioner, a cleaner, an oven, a microwave oven, a washing machine, an air cleaner, a set-top box, a home automation control panel, a security control panel, a TV box (e.g., Samsung HomeSync®, Apple TV®, or Google TV), a game console (e.g., Xbox® or PlayStation®), an electronic dictionary, an electronic key, a camcorder, and an electronic picture frame.

FIG. 1 is a block diagram of an electronic device 100, according to an embodiment of the present disclosure.

Referring to FIG. 1, the electronic device 100 may include an input panel 110, a display 120, a memory 130, and a processor 140.

The input panel 110 may sense a user manipulation (e.g., a touch manipulation or a pen manipulation). The input panel 110 may include a panel 111 and a panel control module 113.

The panel 111 (e.g., a touch screen) may receive a driving signal generated at the panel control module 113 and may scan channels in response to the driving signal. For example, while channels are being scanned, a capacitance or an electric field may be changed if a certain object is adjacent to a certain position of the panel 111. A change in a capacitance or an electric field may be sent to the panel control module 113. The panel 111 may include a touch sensor panel that senses a touch manipulation of a user or a pen sensor panel that senses a pen manipulation of a user. The touch sensor panel and the pen recognition panel may operate similarly or differently. In the case where the touch sensor panel and the pen recognition panel operate similarly (e.g., a capacitive method), the touch sensor panel and the pen recognition panel may be the same panel.

The panel control module 113 may generate a driving signal and may provide the driving signal to the panel 111. The panel control module 113 may sense touch coordinates (e.g., pixel coordinates) corresponding to a touch manipulation (or a pen manipulation) by analyzing a signal received from the panel 111. The panel control module 113 may sense touch coordinates corresponding to a touch manipulation of a user during a certain period (e.g., 10 ms (millisecond)) (or at a frequency (e.g., 100 Hz)). For example, the panel control module 113 may sense touch coordinates corresponding to the touch manipulation of a user by periodically supplying a driving signal to the panel 111. The panel control module 113 may sense x-axis and y-axis touch coordinates corresponding to a touch manipulation of a user. Touch coordinates may include, for example, an x-axis coordinate and a y-axis coordinate corresponding to a touch manipulation.

The panel control module 113 may send touch coordinates to the processor 140. For example, the panel control module 113 may send touch coordinates to the processor 140 during a certain period (e.g., 10 ms).

The input panel 110 may sense a user manipulation input by a user with the user's finger or a pen spaced apart from the panel 111 by a certain distance, as well as a user manipulation input if the user makes direct contact with the panel 111 (e.g., a touch sensor panel or a pen recognition panel).

The display 120 may present a user interface. The display 120 may update a display screen during a certain period (e.g., 16.67 ms) (or at a frequency (e.g., 60 Hz)). For example, the display 120 may update the display screen in synchronization with a vertical synchronization signal (e.g., Vsync) received during a certain period.

The input panel 110 and the display 120, for example, may be implemented with a touch screen that is capable of displaying and sensing a touch manipulation at the same time. In the touch screen, the input panel 111 may be disposed on a display panel.

The memory 130 may store a reference value (e.g., mtouchslop) for determining a movement of a touch manipulation. If a reference value is changed by the processor 140, the memory 130 may store the changed reference value. The memory 130 may store a reference value that is capable of being applied, in common, to an application installed in the electronic device 100. The memory 130 may store reference values that are different from each other for respective applications installed in the electronic device 100. A unit of a reference value stored in the memory 130 may be pixels or density-independent pixels (DP).

The processor 140 may control overall operations of the electronic device 100. The processor 140 may include at least one processor. The processor 140 may process a touch manipulation of a user according to an embodiment of the present disclosure by controlling the input panel 110, the display 120, and the memory 130, respectively. The processor 140 (e.g., an application processor (AP)) may be implemented with a system on chip (SoC) including a central processing unit (CPU), a graphics processing unit (GPU), a memory, and the like.

The processor 140 may determine a touch event corresponding to touch coordinates. A touch event may include, for example, a touch down event (or a touch start event), a touch move event, and a touch up event (or a touch end event). For example, the processor 140 may determine that touch coordinates, which are sensed for the first time on one successive touch manipulation, correspond to a touch down event. As another example, the processor 140 may determine that touch coordinates, which are sensed last on one successive touch manipulation, correspond to a touch up event. As another example, the processor 140 may determine that touch coordinates other than the touch coordinates that are sensed for a first time or for a last time on one successive touch manipulation correspond to a touch move event.

Figure 2:
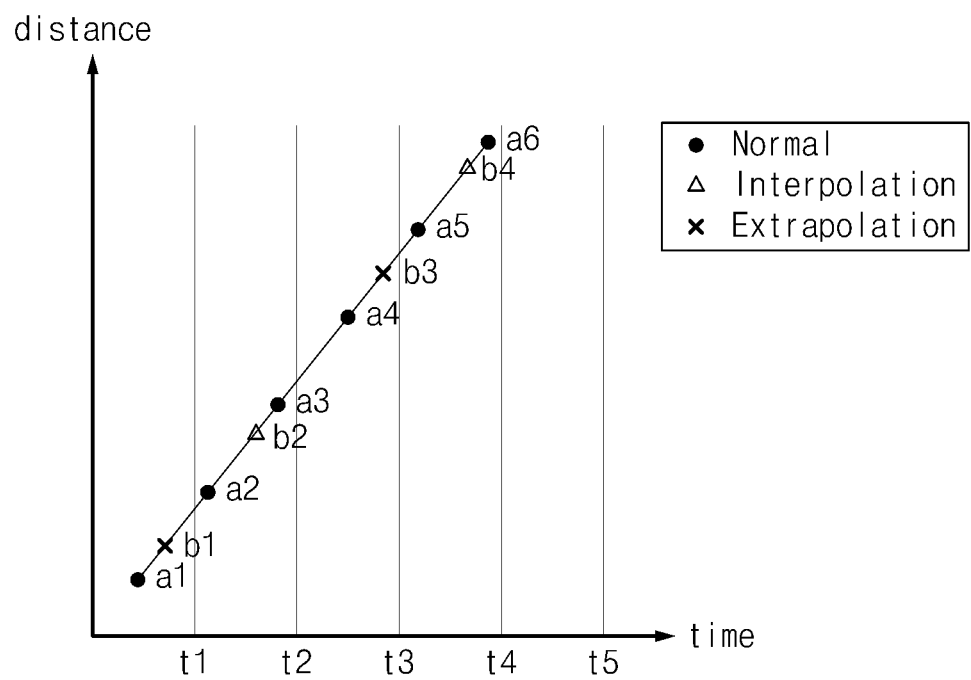
FIG. 2 is a a plot of a resampling result of touch coordinates, according to an embodiment of the present disclosure.

FIG. 2 is a plot of a resampling result of touch coordinates, according to an embodiment of the present disclosure.

The processor 140 may resample touch coordinates received from the input panel 110. The processor 140 may resample touch coordinates based on an update period of the display 120. For example, if a sensing period of an input panel 110 is 10 ms and an update period of the display 120 is 16.67 ms, the processor 140 may resample touch coordinates, which are received from the input panel 110 per 10 ms, based on a time of 16.67 ms being an update period of the display 120. The resampled touch coordinates may be determined by using, for example, interpolation or extrapolation.

Referring to FIG. 2, a movement distance of touch coordinates over time is illustrated. The touch coordinates illustrated in FIG. 2 may include touch coordinates a1 to a6, which are sensed by the input panel 110 during a certain period (e.g., 10 ms), and touch coordinates b1 to b4 that are resampled by the processor 140 based on an update period of the display 120. According to an embodiment of the present disclosure, the processor 140 may resample touch coordinates such that the touch coordinates correspond to a timing faster than each of update timings t1 to t5 of the display 120 (e.g., a timing that is faster by 3 ms than each of the update timings t1 to t5), based on a time at which a touch manipulation is processed. If the first touch coordinates for a1 are received from the input panel 110, the processor 140 may determine the first resampling coordinates for b1 by using extrapolation. If the second touch coordinates a2 and the third touch coordinates for a3 are received from the input panel 110, the processor 140 may determine the second resampling coordinates for b2 by using interpolation. If the fourth touch coordinates for a4 are received from the input panel 110, the processor 140 may determine the third resampling coordinates for b3 by using extrapolation. If the fifth touch coordinates for a5 and the sixth touch coordinates for a6 are received from the input panel 110, the processor 140 may determine the fourth resampling coordinates for b4 by using interpolation.

When the sensing period of the input panel 110 is shorter than the update period of the display 120, the processor 140 may receive a plurality of touch coordinates during the update period of the display 120. If a plurality of touch coordinates is received during an update period of the display 120, the processor 140 may process the plurality of touch coordinates at the same time or may not process a part of the touch coordinates.

The processor 140 may calculate a variation (or a difference value) of touch coordinates by using the touch coordinates received from the input panel 110. The processor 140 may periodically receive touch coordinates from the input panel 110. The processor 140 may calculate a variation between two successive touch coordinates. For example, if first touch coordinates and second touch coordinates are periodically received, the processor 140 may calculate a variation between the first touch coordinates and the second touch coordinates. The processor 140 may calculate a variation of each of an x-axis coordinate and a y-axis coordinate. A unit of a variation may be, for example, pixels.

The processor 140 may calculate a variation of touch coordinates by using original touch coordinates received from the input panel 110. For example, the processor 140 may calculate a variation of touch coordinates by using touch coordinates that are not resampled.

When a user inputs a touch manipulation (or a pen manipulation) to the input panel 110 even though the user does not intend to move a touch manipulation (e.g., in the case where the user inputs a tap manipulation), touch coordinates sensed by the input panel 110 may move due to an effect by an area of a finger or by a minute motion of a finger. To prevent a malfunction (e.g., a movement of a touch manipulation) that a user does not intend, the processor 140 may use a reference value for determining whether a touch manipulation moves.

The processor 140 may determine whether a touch manipulation moves, based on a reference value. For example, the processor 140 may compare a variation of touch coordinates to a reference value and determine whether a touch manipulation moves, based on the comparison. If a variation of touch coordinates is greater than or equal to a reference value, the processor 140 may determine that a touch manipulation moved. If a variation of touch coordinates is less than a reference value, the processor 140 may determine that a touch manipulation stopped (or that a touch manipulation does not move). The processor 140 may determine whether a touch manipulation moves, based on each of a variation of an x-axis coordinate and a variation of a y-axis coordinate.

Figure 3:
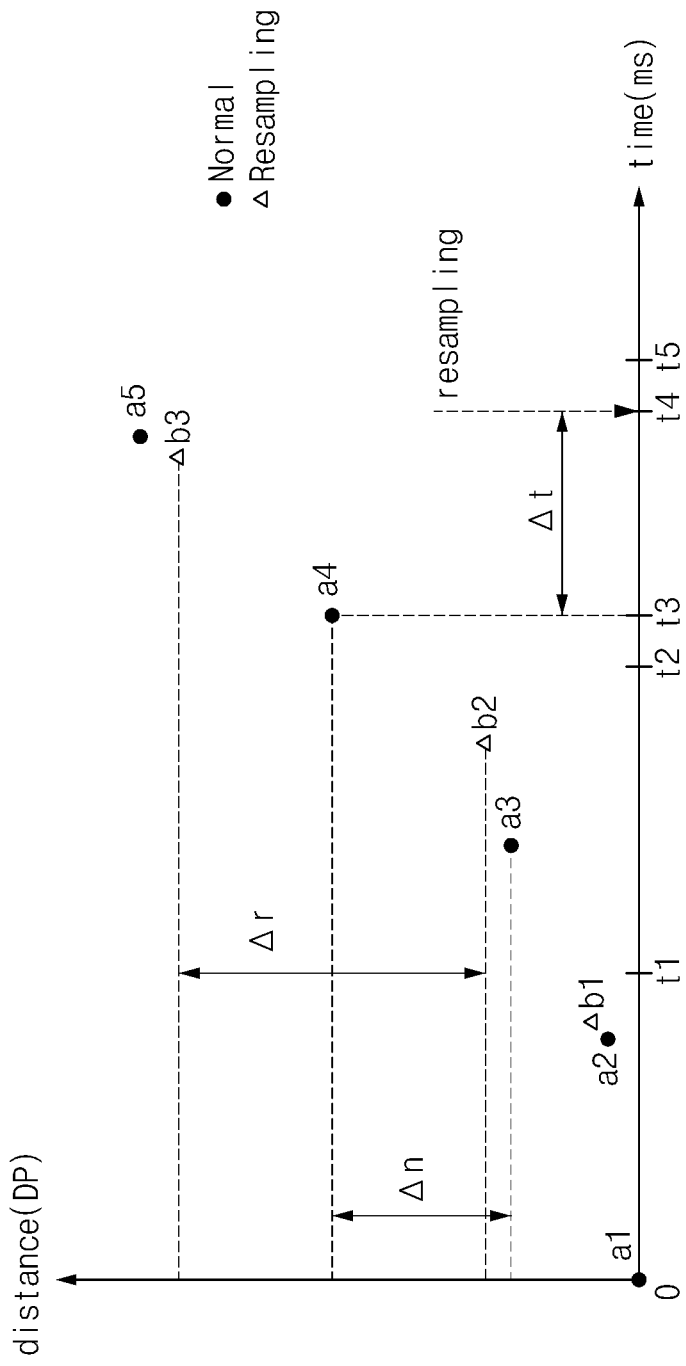
FIG. 3 is a plot of a resampling result of touch coordinates, according to an embodiment of the present disclosure.

FIG. 3 is a plot of a resampling result of touch coordinates, according to an embodiment of the present disclosure.

Referring to FIG. 3, a movement distance of touch coordinates over time is illustrated. The touch coordinates illustrated in FIG. 3 may include touch coordinates a1 to a5, which are sensed by the input panel 110 during a certain period (e.g., 10 ms), and touch coordinates b1 to b3 that are resampled by the processor 140 based on an update period of the display 120. According to an embodiment of the present disclosure, the processor 140 may resample touch coordinates at a timing faster than each of update timings t1, t2 and t5 of the display 120 (e.g., a timing that is faster by 3 ms than each of the update timings t1, t2 and t5), based on a time at which a touch manipulation is processed. If the second touch coordinates for a2 are received from the input panel 110, the processor 140 may determine a first resampling coordinates b1 by using extrapolation. If the third touch coordinates for a3 are received from the input panel 110, the processor 140 may determine the second resampling coordinates for b2 by using extrapolation. If the fifth touch coordinates for a5 are received from the input panel 110, the processor 140 may determine the third resampling coordinates b3 by using interpolation.

The processor 140 may determine whether a touch manipulation moves (e.g., determine whether a variation of touch coordinates is greater than a reference value) by using a variation of touch coordinates that are not resampled. In the case where the processor 140 determines whether a touch manipulation moves by using a variation of touch coordinates that are not resampled, the processor 140 may process a touch manipulation (e.g., determine whether a touch manipulation moves) by comparing a variation $\Delta n$ between the third touch coordinates for a3 and the fourth touch coordinates for a4, which are not resampled at timing t3 at which the fourth touch coordinates for a4 are received from the input panel 110, with a reference value (e.g., 8 DP). In the case where the processor 140 determines whether a touch manipulation moves by using a variation of touch coordinates that are resampled, the processor 140 may process a touch manipulation (e.g., determine whether a touch manipulation moves) by comparing a variation $\Delta r$ between the second resampling coordinates for b2 and the third resampling coordinates for b3 with a reference value (e.g., 8 DP) at timing t4 at which resampling is performed after the fifth touch coordinates for a5 are received from the input panel 110.

When the processor 140 determines whether a touch manipulation moves by using a variation of touch coordinates that are not resampled, the processor 140 may calculate a variation of actual touch coordinates, thereby increasing the accuracy of determining whether a touch manipulation moves. When the processor 140 determines whether a touch manipulation moves by using a variation of touch coordinates that are not resampled, the processor 140 may save a time, at which the touch manipulation is processed, by time $\Delta t$ needed until resampling coordinates are calculated after touch coordinates are received.

Figure 4A:
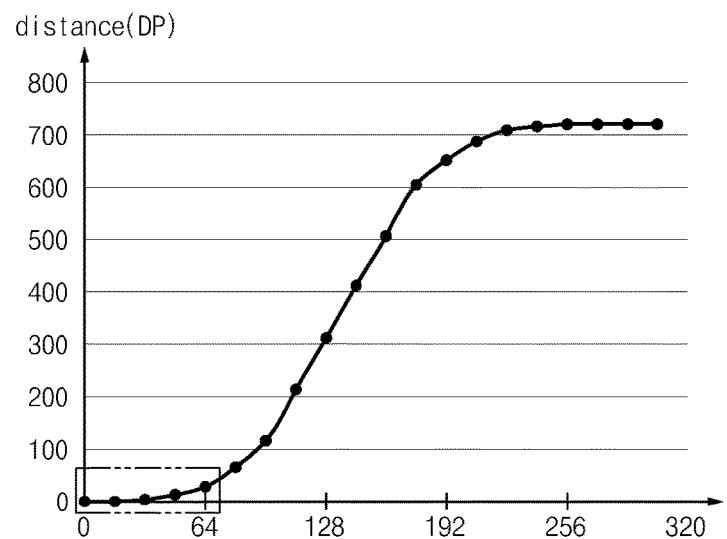
FIGS. 4A and 4B are plots of a movement distance of a touch manipulation over time.
Figure 4B:
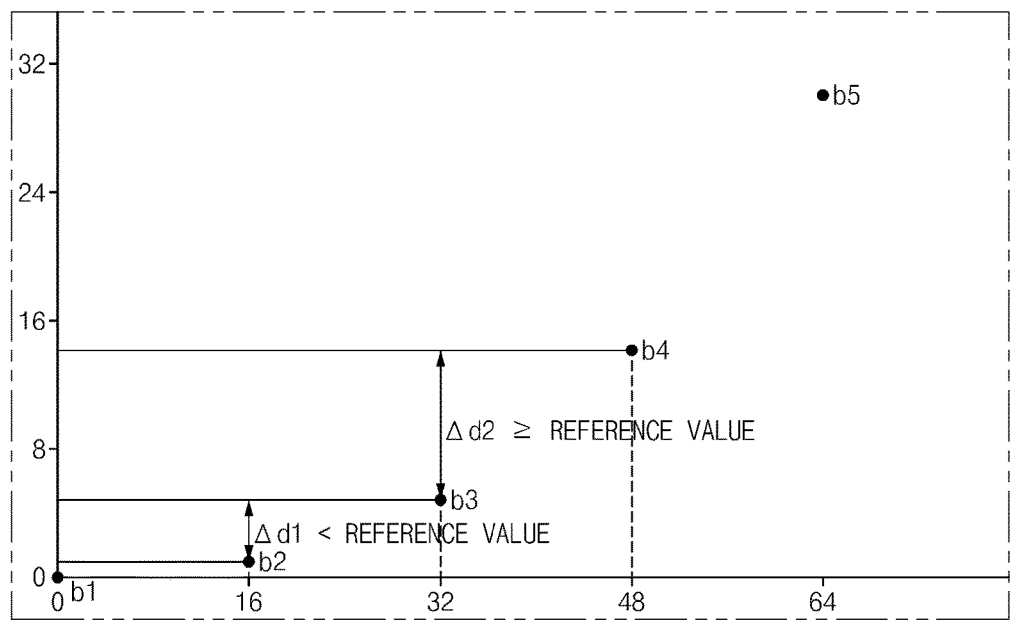

FIGS. 4A and 4B are plots of a movement distance of a touch manipulation over time.

Referring to FIG. 4A, a movement distance (y) of a touch drag manipulation of a user over time (x-axis) is illustrated. A touch drag manipulation of a user may correspond to a motion such as an accelerated motion, a uniform motion, or a decelerated motion.

Referring to FIG. 4B, which is a magnified view of the box that includes times 0 to 64 in FIG. 4A, since a variation $\Delta d1$ between second touch coordinates for b2 and third touch coordinates for b3 is less than a reference value (e.g., 8 DP), the processor 140 may process the third touch coordinates for b3 as being a stop input. Since variation $\Delta d2$ between the third touch coordinates for b3 and fourth touch coordinates for b4 is greater than the reference value, the processor 140 may process the fourth touch coordinates for b4 as being a movement input. Accordingly, after a time of 48 ms elapses after first touch coordinates for b1 are sensed, the processor 140 may determine that a touch manipulation is a touch movement. Accordingly, a speed at which a touch movement of a user is processed may be reduced. As described above, in the case where a speed at which the touch manipulation moves is reduced when a user ends a touch manipulation, some of the last touch movements may be processed as being a stop input.

An electronic device according to an embodiment of the present disclosure may variably set a reference value for determining whether a touch manipulation moves, thereby improving a reaction speed of a touch movement.

The processor 140 may change a reference value for determining whether a touch manipulation moves by using a variation of touch coordinates. The processor 140 may compare a variation of touch coordinates to a current reference value. If a variation of touch coordinates is less than a reference value, the processor 140 may change the reference value to the variation of the touch coordinates. For example, if a reference value that is currently stored in the memory 130 is 8 DP and a variation of touch coordinates is 6 DP, the processor 140 may change the reference value to 6 DP. If a unit of a reference value is DP, after the processor 140 changes from a unit of pixels to a unit of DP, the processor 140 may compare a variation of touch coordinates with the reference value. If a reference value is changed, the processor 140 may store the changed reference value in the memory 130.

The processor 140 may compare each of a variation of an x-axis coordinate and a variation of a y-axis coordinate to a reference value. If at least one of a variation of an x-axis coordinate and a variation of a y-axis coordinate is less than a reference value, the processor 140 may change the reference value to one of the variation of the x-axis coordinate and the variation of the y-axis coordinate. For example, if a current reference value is 8 DP, a variation of an x-axis coordinate is 7 DP, and a variation of a y-axis coordinate is 10 DP, the processor 140 may change the reference value to 7 DP. If both a variation of an x-axis coordinate and a variation of a y-axis coordinate are less than a reference value, the processor 140 may change the reference value to one (e.g., a smallest value or a greatest value) of the variation of the x-axis coordinate and the variation of the y-axis coordinate. For example, if a current reference value is 8 DP, a variation of the x-axis coordinate is 7 DP, and a variation of the y-axis coordinate is 6 DP, the processor 140 may change the reference value to 6 DP.

The processor 140 may change a reference value in a certain range (or a change range of a reference value or pre-determined range). For example, in the case where a variation of touch coordinates is out of a certain range even though the variation of the touch coordinates is less than a current reference value, the processor 140 may not change the reference value. For example, if a certain range is set to 6 to 8 DP, a current reference value is 7 DP, a variation of an x-axis coordinate is 4 DP, a variation of a y-axis coordinate is 10 DP, where the variation of the touch coordinates is out of the certain range, and where the variation of the x-axis coordinate is less than the reference value, the processor 140 may maintain the reference value at 7 DP. As another example, if the certain range is set to 6 to 8 DP, a current reference value is 7 DP, a variation of an x-axis coordinate is 4 DP, and a variation of the y-axis coordinate is 5 DP, where the variation of the touch coordinates is out of the certain range, and where the variation of the x-axis coordinate and the variation of the y-axis coordinate are less than the reference value, the processor 140 may maintain the reference value at 7 DP.

Figure 5:
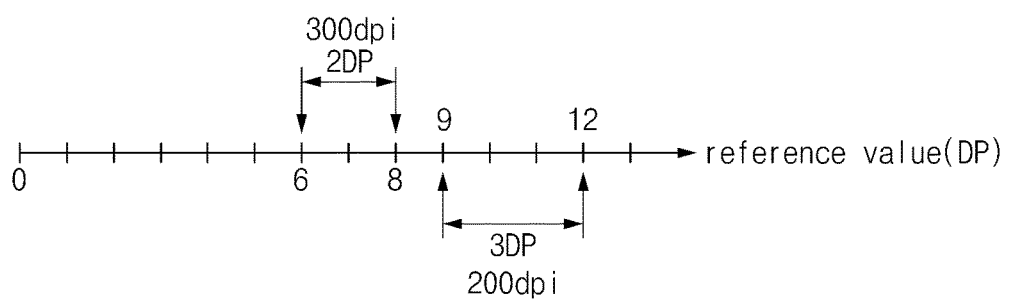
FIG. 5 is a plot of a change range of a reference value, according to an embodiment of the present disclosure.

FIG. 5 is a plot of a change range of a reference value, according to an embodiment of the present disclosure.

Referring to FIG. 5, the change range of a reference value may be set based on pixel density or pixel size (e.g., a width or a height) of the display 120. A maximum value and a minimum value of a change range of a reference value may be set such that the maximum value and the minimum value are inversely proportional to pixel density of the display 120 (or the maximum value and the minimum value are proportional to pixel size of the display 120). For example, as pixel density of the display 120 increases (e.g., as the resolution of the display 120 increases or the display size decreases), a maximum value and a minimum value of a change range of a reference value may be set such that the maximum value and the minimum value decrease. As pixel density of the display 120 decreases (e.g., as the resolution of the display 120 decreases or the display size increases), a maximum value and a minimum value of a change range of a reference value may be set such that the maximum value and the minimum value increase. For example, in the case where pixel density of the display 120 is 300 pixels per inch (ppi), a minimum value and a maximum value of a change range of a reference value may be set to 6 DP and 8 DP, respectively. In the case where a pixel density is 200 ppi, a minimum value and a maximum value of a change range of a reference value may be set to 9 DP and 12 DP, respectively.

A difference between a maximum value and a minimum value of a change range of a reference value may be set such that the difference is inversely proportional to pixel density of the display 120 (or the difference is proportional to pixel size of the display 120). For example, as pixel density of the display 120 increases, a difference between a maximum value and a minimum value of a change range of a reference value may be set such that the difference decreases. As pixel density of the display 120 decreases, a difference between a maximum value and a minimum value of a change range of a reference value may be set such that the difference increases. For example, in the case where pixel density of the display 120 is 300 ppi, a difference between a maximum value and a minimum value of a change range of a reference value may be set to 2 DR In the case where pixel density is 200 ppi, a difference between a maximum value and a minimum value of a change range of a reference value may be set to 3 DP.

A change range of a reference value may be a preset value if the electronic device 100 is manufactured.

The processor 140 may change a reference value based on a touch event. If the processor 140 determines that a touch move event occurred, the processor 140 may count a number of occurrences of the touch move event. If the number of occurrences of the touch move event is greater than or equal to a certain number of times (e.g., a pre-determined number of times), the processor 140 may change a reference value. For example, if the number of occurrences of a touch move event is 3 or more, the processor 140 may compare a variation of touch coordinates to a reference value. If a variation of a touch coordinates is less than a reference value, the processor 140 may change the reference value to the variation of the touch coordinates.

If a touch down event or a touch up event occurs, the processor 140 may initialize a number of times that a touch move event is received. If a reference value is changed, the processor 140 may initialize a number of times that the touch move event is received.

The processor 140 may perform a function corresponding to a touch manipulation based on a result of determining whether the touch manipulation moves. For example, the processor 140 may perform a function corresponding to a touch manipulation based on at least one of touch coordinates and a variation of touch coordinates and based on a result of determining whether the touch manipulation moves. For example, the processor 140 may display a user interface corresponding to a touch manipulation on the display 120 in synchronization with an update timing of the display 120. If the processor 140 determines that a touch manipulation moved (or determines that the touch manipulation is a movement input), the processor 140 may perform a function corresponding to the movement of the touch manipulation. For example, if the processor 140 determines that a touch manipulation moved, the processor 140 may move an icon displayed on the display 120 such that the icon corresponds to the movement of the touch manipulation.

The processor 140 may accumulate a touch manipulation and process the accumulated touch manipulation. For example, the processor 140 may accumulate a movement distance of a touch manipulation, which is determined as a movement input, or a number of movements of the touch manipulation; if the processor 140 determines that the accumulated movement distance of the touch manipulation is greater than or equal to a certain distance or determines that the accumulated number of movements of the touch manipulation is greater than or equal to a certain number of times, the processor 140 may perform a function corresponding to the movement of the touch manipulation. If the processor 140 determines that a touch manipulation stopped (or determines that the touch manipulation is a stop input), the processor 140 may disregard the touch manipulation or may perform a function corresponding to the stop of the touch manipulation.

The processor 140 may perform a function corresponding to a touch manipulation based on variations of resampled touch coordinates and touch coordinates that are not resampled. For example, the processor 140 may determine that a touch manipulation of a user moved to resampled touch coordinates by a variation of touch coordinates that are not resampled.

To improve a reaction speed of a touch manipulation, a sensing period of an input panel 110 may be set to be less than an update period of the display 120. Even though a sensing period of an input panel 110 is set to be the same as an update period of the display 120, the processor 140 may accurately and rapidly process a touch manipulation. Accordingly, power consumed to drive the input panel 110 may be reduced.

An electronic device may include an input panel configured to periodically sense touch coordinates corresponding to a touch manipulation of a user and a processor configured to periodically receive the touch coordinates from the input panel to calculate a variation of the touch coordinates based on the touch coordinates, change a reference value for determining movement of the touch manipulation based on the variation of the touch coordinates, and determine whether the touch manipulation moves, based on the reference value.

A reference value into a variation of touch coordinates if a variation of the touch coordinates is less than the reference value.

A processor may change a reference value in a certain range.

A certain range may be proportional to a pixel density.

A processor may determine a touch event corresponding to touch coordinates, count a number of times that a touch move event in the touch event is received and change a reference value if the number of times that the touch move event is received is greater than or equal to a certain number of times.

A processor may initialize a number of times that a touch move event is received, if a touch down event or a touch up event is received from an input panel or if a reference value is changed.

A processor may determine that a touch manipulation moved, if a variation of touch coordinates is greater than or equal to a reference value, and determine that the touch manipulation stopped, if the variation of the touch coordinates is less than the reference value.

Touch coordinates may comprise an x-axis coordinate and a y-axis coordinate corresponding to a touch manipulation, and a processor may calculate a variation of each of the x-axis coordinate and the y-axis coordinate and determine that the touch manipulation moved, if at least one of the variation of the x-axis coordinate and the variation of the y-axis coordinate is greater than or equal to a reference value.

An electronic device may include a display, an input panel configured to periodically sense touch coordinates corresponding to a touch manipulation of a user and a processor configured to periodically receive the touch coordinates from the input panel, calculate a variation of the touch coordinates based on the touch coordinates, determine resampling coordinates of the touch coordinates based on an update period of the display, determine whether the touch manipulation moves, based on the variation of the touch coordinates, and perform a function corresponding to the determination result based on the resampling coordinates.

A processor may determine that a touch manipulation moved, if a variation of touch coordinates is greater than or equal to a certain reference value and determine that the touch manipulation stopped, if the variation of the touch coordinates is less than the reference value.

A processor may change a certain reference value by using a variation of touch coordinates.

Touch coordinates may comprise an x-axis coordinate and a y-axis coordinate corresponding to a touch manipulation, and a processor may calculate a variation of each of the x-axis coordinate and the y-axis coordinate and determine that the touch manipulation moved, if at least one of a variation of the x-axis coordinate and a variation of the y-axis coordinate is greater than or equal to a reference value.

Touch coordinates may comprise an x-axis coordinate and a y-axis coordinate corresponding to a touch manipulation, and a processor may calculate a variation of each of the x-axis coordinate and the y-axis coordinate and determine resampling coordinates based on each of the x-axis coordinate and the y-axis coordinate.

The electronic device may include an input panel and a processor. The processor may receive an input through the input panel, may obtain first coordinates and second coordinates on the input panel corresponding to the input, and may change a reference value for determining whether a touch manipulation moves, if a variation satisfies a certain condition based at least on a variation between the first coordinates and the second coordinates.

The electronic device may include an input panel and a processor. The processor may receive an input through the input panel, obtain first coordinates and second coordinates on the input panel corresponding to an input, determine interpolated coordinates (e.g. resampled coordinates) corresponding to the first coordinates based on an update period of the display, determine an input event corresponding to the input based at least on a variation between the first coordinates and the second coordinates, and perform a function corresponding to an input event based at least on interpolated coordinates (e.g. resampled coordinates).

Figure 6:
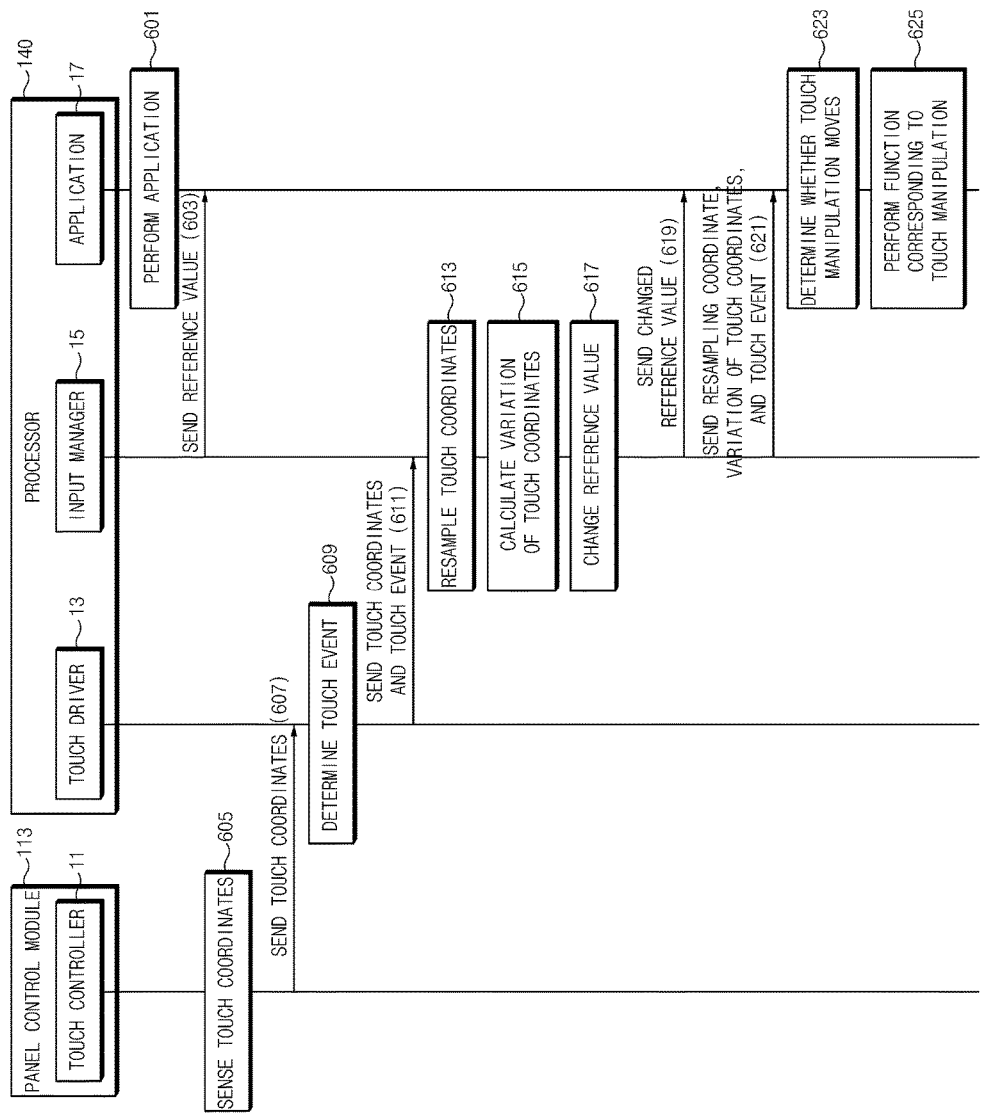
FIG. 6 is a flow diagram of a touch processing method of an electronic device, according to an embodiment of the present disclosure.

FIG. 6 is a flow diagram of a touch processing method of an electronic device, according to an embodiment of the present disclosure.

The flow diagram in FIG. 6 may illustrate a touch processing process by the electronic device 100 illustrated in FIG. 1. Details about the electronic device 100 may be applied to the flow diagram shown in FIG. 6 with reference to FIGS. 1 to 5 described above.

Referring to FIG. 6, the electronic device 100 may include a touch controller 11, which is performed by the panel control module 113, and a touch driver 13, an input manager 15, and an application 17 that are performed by the processor 140. The input manager 15 may correspond to, for example, a middleware 1230 of FIG. 12 described below. The input manager 15 may process data associated with a user input and may send the processed data to the application 17.

In operation 601, the electronic device 100 (e.g., the processor 140) may execute the application 17.

In operation 603, if the application 17 is executed, the electronic device 100 (e.g., the input manager 15) may send a reference value to the application 17. If the application 17 is executed for the first time or if the reference value is changed, the electronic device 100 may send the reference value to the application 17.

In operation 605, the electronic device 100 (e.g., the touch controller 11) may sense touch coordinates. The touch controller 11 may sense x-axis and y-axis touch coordinates corresponding to a touch manipulation of a user.

In operation 607, the electronic device 100 (e.g., the touch controller 11) may send the touch coordinates to the touch driver 13.

In operation 609, the electronic device 100 (e.g., the touch driver 13) may determine a touch event corresponding to the touch coordinates. The touch event may include, for example, a touch down event (or a touch start event), a touch move event, and a touch up event (or a touch end event).

In operation 611, the electronic device 100 (e.g., the touch driver 13) may send the touch coordinates and the touch event to the input manager 15.

In operation 613, the electronic device 100 (e.g., the input manager 15) may resample the touch coordinates received from the touch driver 13. The input manager 15 may resample the touch coordinates based on an update period of the display 120.

In operation 615, the electronic device 100 (e.g., the input manager 15) may calculate a variation of the touch coordinates. The input manager 15 may calculate the variation of the touch coordinates by using the touch coordinates (i.e., touch coordinates that are not resampled) that are received from the touch driver 13. The input manager 15 may calculate the variation of each of an x-axis coordinate and a y-axis coordinate.

In operation 617, the electronic device 100 (e.g., the input manager 15) may change a reference value for determining whether a touch manipulation moves. The input manager 15 may compare a variation of touch coordinates to a currently set reference value and may change the reference value to the variation of the touch coordinates if the variation of the touch coordinates is less than the reference value. The input manager 15 may compare each variation of the x-axis coordinate and the y-axis coordinate to the reference value; if at least one variation of the x-axis coordinate and the y-axis coordinate is less than the reference value, the processor 140 may change the reference value to a variation of the x-axis coordinate or the y-axis coordinate. The input manager 15 may change the reference value in a certain range (e.g. a change range of the reference value). If a number of occurrences of a touch move event received from the touch driver 13 is greater than or equal to the certain number of times, the input manager 15 may change the reference value. The change range of the reference value may be set based on a pixel density or a pixel size (e.g., a width or a height) of the display 120.

If the reference value is changed, in operation 619, the electronic device 100 (e.g., the input manager 15) may send the changed reference value to the application 17. The input manager 15 may store the changed reference value in an area of the memory 130. The application 17 may receive the changed reference value from the input manager 15 in a manner of referring to the reference value stored in the memory 130. In operation 617, if the reference value is not changed (e.g., if the variation of the touch coordinates is greater than or equal to the reference value), operation 619 may be omitted.

In operation 621, the electronic device 100 (e.g., the input manager 15) may send a resampling coordinate, a variation of the touch coordinates, and the touch event to the application 17.

In operation 623, the electronic device 100 (e.g., the application 17) may determine whether the touch manipulation moves, by using the reference value received from the input manager 15. If the variation of the touch coordinates is greater than or equal to the reference value, the application 17 may determine that the touch manipulation moved. If the variation of the touch coordinates is less than the reference value, the application 17 may determine that the touch manipulation stopped (or that the touch manipulation does not move). The application 17 may determine whether the touch manipulation moves, based on each of a variation of an x-axis coordinate and a variation of a y-axis coordinate.

In operation 625, the electronic device 100 (e.g., the application 17) may perform a function corresponding to the touch manipulation based on the determination result. The application 17 may perform a function corresponding to the touch manipulation based on at least one of the touch coordinates and a variation of the touch coordinates. The application 17 may accumulate a touch manipulation and may process the accumulated touch manipulation. For example, the application 17 may accumulate a movement distance of a touch manipulation, which is determined as the movement input, or a number of movements of a touch manipulation; if the application 17 determines that an accumulated movement distance of a touch manipulation is greater than or equal to a certain distance or determines that an accumulated number of movements of a touch manipulation is greater than or equal to a certain number of times, the application 17 may perform a function corresponding to a movement of a touch manipulation.

A touch event is described above with reference to FIG. 6 as being determined by the touch driver 13. However, according to an embodiment of the present disclosure, a touch event may be determined by the input manager 15.

Figure 7:
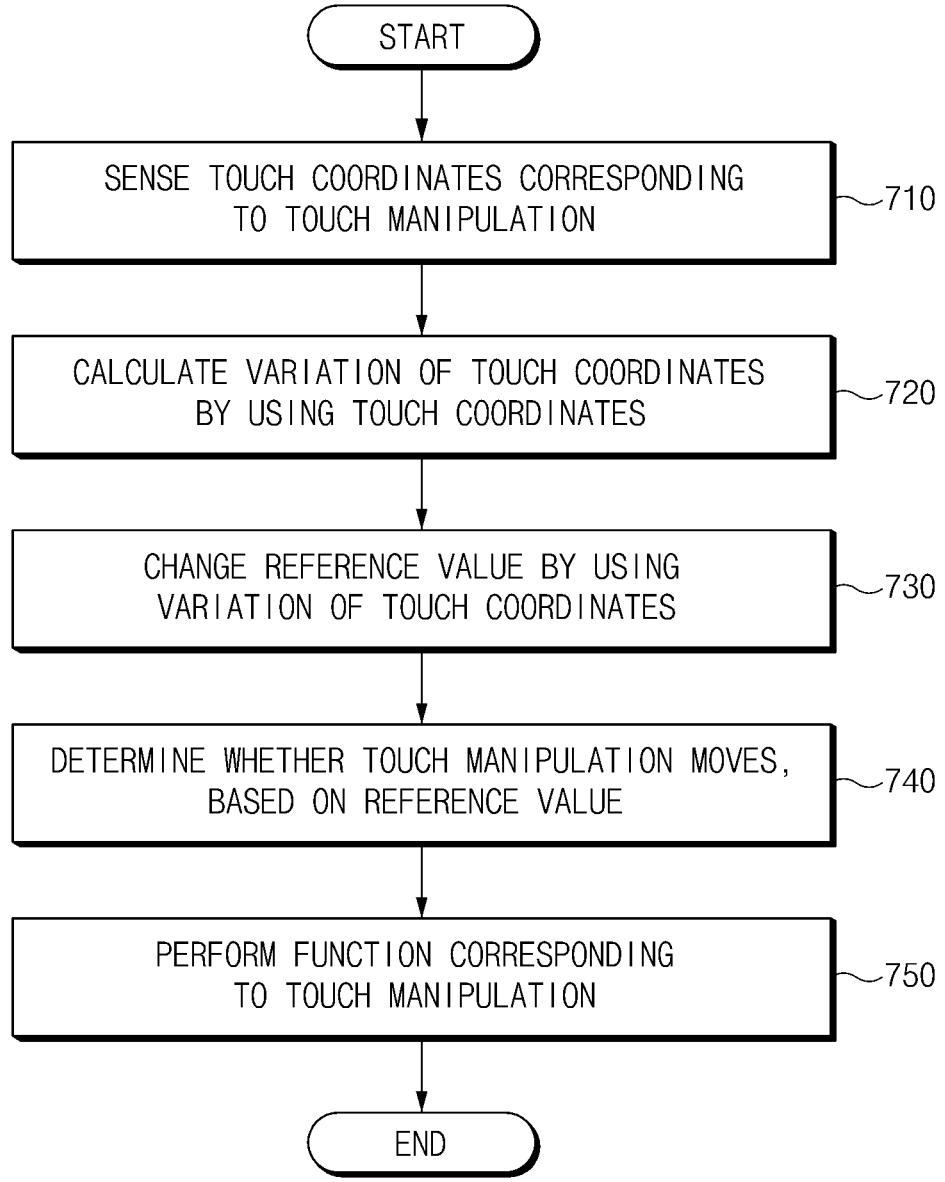
FIG. 7 is a flowchart of a touch processing method of an electronic device, according to an embodiment of the present disclosure.

FIG. 7 is a flowchart of a touch processing method of an electronic device, according to an embodiment of the present disclosure.

The flowchart illustrated in FIG. 7 may include operations processed by the electronic device 100 illustrated in FIG. 1. Details about the electronic device 100 may be applied to the flowchart shown in FIG. 7 with reference to FIGS. 1 to 5 described above.

Referring to FIG. 7, in operation 710, the electronic device 100 (e.g., the input panel 110) may sense touch coordinates corresponding to a touch manipulation (or a pen manipulation) of a user. The electronic device 100 may periodically sense touch coordinates corresponding to a touch manipulation of a user through the input panel 110. The electronic device 100 may sense x-axis and y-axis touch coordinates corresponding to a touch manipulation of a user.

The electronic device 100 (e.g., the processor 140) may determine a touch event corresponding to touch coordinates. A touch event may include, for example, a touch down event (or a touch start event), a touch move event, and a touch up event (or a touch end event).

In operation 720, the electronic device 100 (e.g., the processor 140) may calculate a variation of touch coordinates (or a difference value) by using touch coordinates. The electronic device 100 may calculate a variation between two successive touch coordinates. The electronic device 100 may calculate a variation of each of an x-axis coordinate and a y-axis coordinate.

In operation 730, the electronic device 100 (e.g., the processor 140) may change a reference value for determining whether a touch manipulation moves. The electronic device 100 may compare a variation of touch coordinates to a currently set reference value and may change the reference value to a variation of the touch coordinates if the variation of the touch coordinates is less than the reference value. The electronic device 100 may compare each of a variation of an x-axis coordinate and a variation of a y-axis coordinate to a reference value. If at least one of a variation of an x-axis coordinate and a variation of a y-axis coordinate is less than a reference value, the electronic device 100 may change the reference value to one of the variation of the x-axis coordinate and the variation of the y-axis coordinate. The electronic device 100 may change a reference value in a certain range (or a change range of the reference value). If a number of occurrences of a touch move event received from the touch driver 13 is greater than or equal to a certain number of times, the electronic device 100 may change the reference value. The change range of a reference value may be set based on pixel density or pixel size (e.g., a width or a height) of the display 120.

In operation 740, the electronic device 100 (e.g., the processor 140) may determine whether a touch manipulation moves, by using a reference value. For example, in operation 730, if a reference value is changed, the electronic device 100 may determine whether a touch manipulation moves, based on the changed reference value. If a variation of touch coordinates is greater than or equal to a reference value, the electronic device 100 may determine that a touch manipulation moved. If a variation of touch coordinates is less than a reference value, the electronic device 140 may determine that a touch manipulation stopped (or that the touch manipulation does not move). The electronic device 100 may determine whether a touch manipulation moves, based on each of a variation of an x-axis coordinate and a variation of a y-axis coordinate.

In operation 750, the electronic device 100 (e.g., the processor 140) may perform a function corresponding to a touch manipulation based on a determination result. The electronic device 100 may perform a function corresponding to a touch manipulation based on at least one of touch coordinates and a variation of the touch coordinates. The electronic device 100 may accumulate a touch manipulation and may process the accumulated touch manipulation. For example, the electronic device 100 may accumulate a movement distance of a touch manipulation, which is determined as a movement input, or a number of movements of the touch manipulation; if the electronic device 100 determines that an accumulated movement distance of a touch manipulation is greater than or equal to a certain distance or determines that an accumulated number of movements of a touch manipulation is greater than or equal to a certain number of times, the electronic device 100 may perform a function corresponding to the movement of the touch manipulation.

Figure 8:
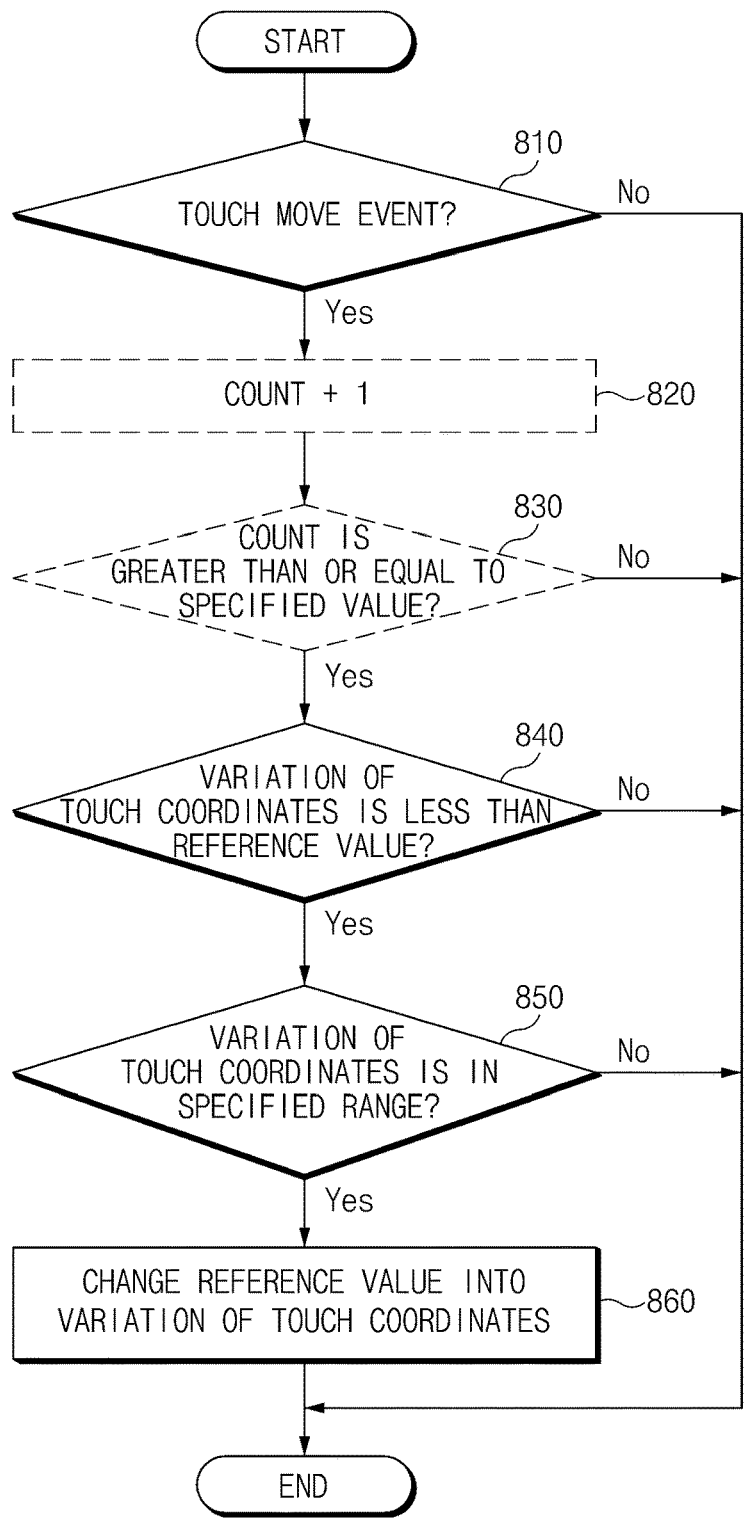
FIG. 8 is a flowchart of a reference value changing method of an electronic device, according to an embodiment of the present disclosure.

FIG. 8 is a flowchart of a reference value changing method of an electronic device, according to an embodiment of the present disclosure.

The flowchart illustrated in FIG. 8 may include operations which the electronic device 100 illustrated in FIG. 1 processes. Details about the electronic device 100 may be applied to the flowchart shown in FIG. 8 with reference to FIGS. 1 to 5 described above.

Referring to FIG. 8, in operation 810, the electronic device 100 (e.g., the processor 140) may determine whether a touch move event occurred. For example, the electronic device 100 may determine whether a touch move event occurred, based on touch coordinates that are sent from the input panel 110 to the processor 140.

If the electronic device 100 (e.g., the processor 140) determines that a touch move event occurs, in operation 820, the electronic device 100 may count a number of occurrences (or a count) of the touch move event. If a touch move event does not occur (e.g., if a touch down event or a touch up event occurs), the electronic device 100 may end the process of changing a reference value.

In operation 830, the electronic device 100 (e.g., the processor 140) may determine whether a number of occurrences (or a count) of a touch move event is greater than or equal to a certain value.

If a number of occurrences of a touch move event is greater than or equal to a certain value, in operation 840, the electronic device 100 (e.g., the processor 140) may determine whether a variation of touch coordinates is less than a reference value. If a number of occurrences of a touch move event is greater than or equal to a certain value, the electronic device 100 may end the process of changing the reference value.

If a variation of touch coordinates is less than a reference value, the electronic device 100 (e.g., the processor 140) may determine whether the variation of the touch coordinates is in a certain range (or a change range of the reference value). A change range of a reference value may be set based on a pixel density or a pixel size (e.g., a width or a height) of a display. A maximum value and a minimum value of a change range of a reference value may be set to be inversely proportional to a pixel density (or proportional to a pixel size). A difference between a maximum value and a minimum value of a change range of a reference value may be set to be inversely proportional to a pixel density (or proportional to pixel size). A preset value upon manufacturing the electronic device 100 may be set as a change range of a reference value. If a variation of touch coordinates is greater than a reference value, the electronic device 100 may end the process of changing the reference value.

If a variation of touch coordinates is in a certain range, in operation 860, the electronic device 100 (e.g., the processor 140) may change a reference value to the variation of the touch coordinates.

Alternatively, operations 820 and 830 may be omitted. For example, when a running application (e.g., an application that performs a function corresponding to a touch manipulation) accumulates a number of movements of a touch manipulation and processes the accumulated number of movements of the touch manipulation, operations 820 and 830 may be performed. However, in the case where a running application processes a touch manipulation regardless of a number of movements of a touch manipulation, operations 820 and 830 may be omitted.

Figure 9:
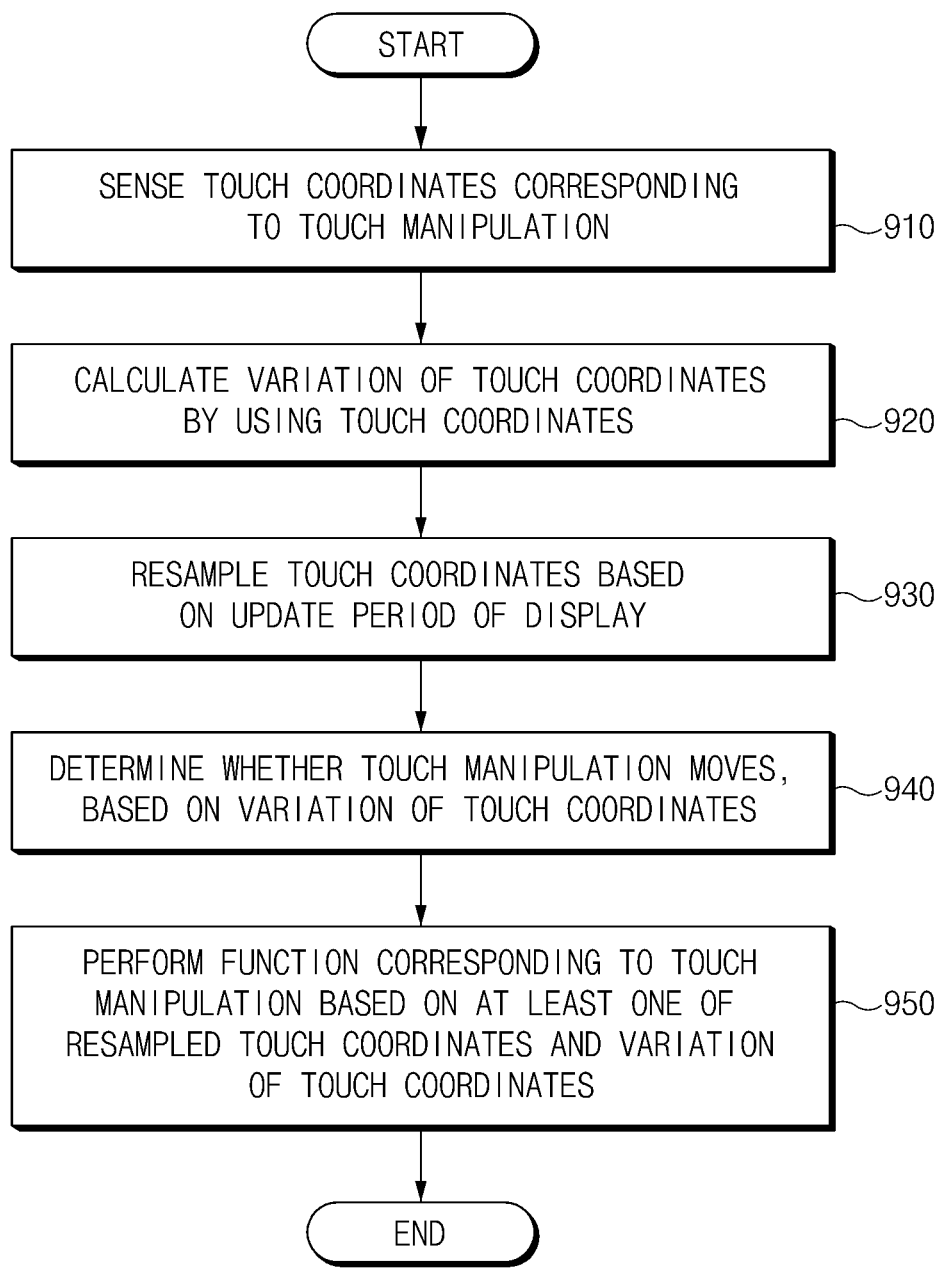
FIG. 9 is a flowchart of a reference value changing method of an electronic device, according to an embodiment of the present disclosure.

FIG. 9 is a flowchart of a reference value changing method of an electronic device, according to an embodiment of of the present disclosure.

The flowchart illustrated in FIG. 9 may include operations which the electronic device 100 illustrated in FIG. 1 processes. Details about the electronic device 100 may be applied to the flowchart shown in FIG. 9 with reference to FIGS. 1 to 5 described above.

Referring to FIG. 9, in operation 910, the electronic device 100 (e.g., the input panel 110) may sense touch coordinates corresponding to a touch manipulation (or a pen manipulation) of a user. The electronic device 100 may periodically sense touch coordinates corresponding to a touch manipulation of a user through the input panel 110. The electronic device 100 may sense x-axis and y-axis touch coordinates corresponding to a touch manipulation of a user.

The electronic device 140 (e.g., the processor 140) may determine a touch event corresponding to touch coordinates. A touch event may include, for example, a touch down event (or a touch start event), a touch move event, and a touch up event (or a touch end event).

In operation 920, the electronic device 100 (e.g., the processor 140) may calculate a variation of touch coordinates (or a difference value) by using the touch coordinates. According to an embodiment of the present disclosure, the electronic device 100 may calculate a variation between two successive touch coordinates. The electronic device 100 may calculate a variation of each of an x-axis coordinate and a y-axis coordinate.

In operation 930, the electronic device 100 (e.g., the processor 140) may resample touch coordinates. According to an embodiment of the present disclosure, the electronic device 100 may resample touch coordinates based on an update period of a display.

In operation 940, the electronic device 100 (e.g., the processor 140) may determine whether a touch manipulation moves, based on a variation of touch coordinates. According to an embodiment of the present disclosure, the electronic device 100 may determine whether a touch manipulation moves, by using a variation of touch coordinates that are not resampled. If a variation of touch coordinates is greater than or equal to a reference value, the electronic device 100 may determine that a touch manipulation moved. If a variation of touch coordinates is less than a reference value, the electronic device 140 may determine that a touch manipulation stopped (or that the touch manipulation does not move). The electronic device 100 may determine whether a touch manipulation moves, based on each of a variation of an x-axis coordinate and a variation of a y-axis coordinate.

In operation 950, the electronic device 100 (e.g., the processor 140) may perform a function corresponding to a touch manipulation based on at least one of resampled touch coordinates and a variation of touch coordinates. The electronic device 100 may perform a function corresponding to a touch manipulation based on a result of determining whether a touch manipulation moves. The electronic device 100 may accumulate a touch manipulation and may process the accumulated touch manipulation. For example, the electronic device 100 may accumulate a movement distance of a touch manipulation, which is determined as a movement input, or a number of movements of the touch manipulation; if the electronic device 100 determines that an accumulated movement distance of a touch manipulation is greater than or equal to a certain distance or determines that an accumulated number of movements of a touch manipulation is greater than or equal to a certain number of times, the electronic device 100 may perform a function corresponding to the movement of the touch manipulation.

An input processing method of an electronic device may include periodically sensing touch coordinates corresponding to a touch manipulation of a user, calculating a variation of the touch coordinates based on the touch coordinates, changing a reference value for determining movement of the touch manipulation by using the variation of the touch coordinates and determining whether the touch manipulation moves, based on the reference value.

Changing a reference value may include changing the reference value to a variation of touch coordinates if the variation of the touch coordinates is less than the reference value.

Changing a reference value may include changing the reference value in a certain range.

A certain range may be proportional to a pixel density.

A touch event corresponding to touch coordinates may be determined, and changing a reference value may include counting a number of occurrences of a touch move event in the touch event and changing the reference value if the number of occurrences of the touch move event is greater than or equal to a certain number of times.

Changing a reference value may further include initializing a number of occurrences of a touch move event if a touch down event or a touch up event is received from an input panel or if the reference value is changed.

Determining whether a touch manipulation moves may include determining that the touch manipulation moved if a variation of touch coordinates is greater than or equal to a reference value, and determining that the touch manipulation stopped if the variation of the touch coordinates is less than the reference value.

Touch coordinates may include an x-axis coordinate and a y-axis coordinate corresponding to the touch manipulation, and determining whether the touch manipulation moves may include calculating a variation of each of the x-axis coordinate and the y-axis coordinate and determining that the touch manipulation moved if at least one of the variation of the x-axis coordinate and the variation of the y-axis coordinate is greater than or equal to a reference value.

An input processing method of an electronic device may include periodically sensing touch coordinates corresponding to a touch manipulation of a user, calculating a variation of the touch coordinates based on the touch coordinates, determining resampling coordinates of the touch coordinates based on an update period of a display, determining whether the touch manipulation moves, based on the variation of the touch coordinates and performing a function corresponding to the determined result based on the resampling coordinates.

Touch coordinates may include an x-axis coordinate and a y-axis coordinate corresponding to the touch manipulation. The determining of whether the touch manipulation moves may include calculating the variation of each of the x-axis coordinate and the y-axis coordinate and resampling each of the x-axis coordinate and the y-axis coordinate.

An input processing method of an electronic device that includes an input panel and a processor may include receiving an input through the input panel, obtaining first coordinates and second coordinates on the input panel corresponding to the input, and changing a reference value for determining whether the touch manipulation moves, if a variation satisfies a certain condition based at least on a variation between the first coordinates and the second coordinates.

An input processing method of an electronic device that includes an input panel and a processor may include receiving an input through the input panel, obtaining first coordinates and second coordinates on the input panel corresponding to the input, determining interpolated coordinates (resampled coordinates) corresponding to the first coordinates based on an update period of a display, determining an input event corresponding to the input by using the processor based at least on a variation between the first coordinates and the second coordinates, and performing a function corresponding to the input event based at least on the interpolated coordinates (the resampled coordinates).

Figure 10:
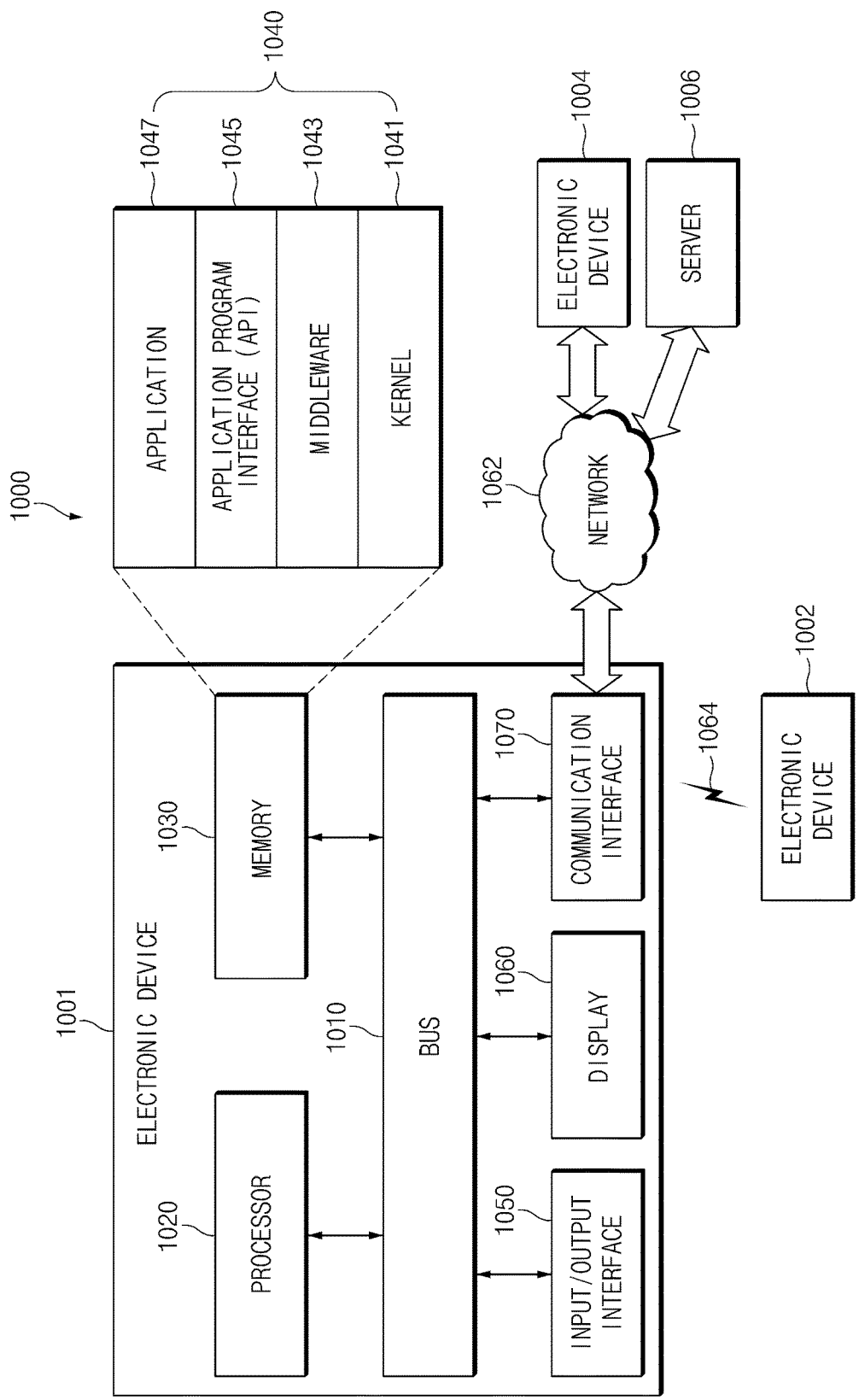
FIG. 10 is a block diagram of an electronic device in a network environment, according to an embodiment of the present disclosure.

FIG. 10 is a block diagram of an electronic device 1001 in a network environment 1000 according to an embodiment of the present disclosure.

Referring to FIG. 10, the electronic device 1001 may include a bus 1010, a processor 1020, a memory 1030, an input/output interface 1050, a display 1060, and a communication interface 1070. According to an embodiment of the present disclosure, at least one of the foregoing elements may be omitted or another element may be added to the electronic device 1001.

The bus 1010 may include a circuit for connecting the above-mentioned elements 1010 to 1070 to each other and transferring communications (e.g., control messages and/or data) among the above-mentioned elements 1010 to 1070.

The processor 1020 may include at least one of a central processing unit (CPU), an application processor (AP), and a communication processor (CP). The processor 1020 may perform data processing or an operation related to communication and/or control of at least one of the other elements 1010 to 1070 of the electronic device 1001.

The memory 1030 may include a volatile memory and/or a nonvolatile memory. The memory 1030 may store instructions or data related to at least one of the other elements 1020 and 1050-1070 of the electronic device 1001. According to an embodiment of the present disclosure, the memory 1030 may store software and/or a program 1040. The program 1040 may include, for example, a kernel 1041, a middleware 1043, an application programming interface (API) 1045, and/or an application program (or an application) 1047. At least a portion of the kernel 1041, the middleware 1043, or the API 1045 may be referred to as an operating system (OS).

The kernel 1041 may control or manage system resources (e.g., the bus 1010, the processor 1020, the memory 1030, or the like) used to perform operations or functions of other programs (e.g., the middleware 1043, the API 1045, or the application program 1047). Further, the kernel 1041 may provide an interface for allowing the middleware 1043, the API 1045, or the application program 1047 to access individual elements of the electronic device 1001 in order to control or manage the system resources.

The middleware 1043 may serve as an intermediary so that the API 1045 or the application program 1047 communicates and exchanges data with the kernel 1041.

Further, the middleware 1043 may handle one or more task requests received from the application program 1047 according to a priority order. For example, the middleware 1043 may assign at least one application program 1047 a priority for using the system resources (e.g., the bus 1010, the processor 1020, the memory 1030, or the like) of the electronic device 1001. For example, the middleware 1043 may handle the one or more task requests according to the priority assigned to the at least one application program 1047, thereby performing scheduling or load balancing with respect to the one or more task requests.

The API 1045, which is an interface for allowing the application 1047 to control a function provided by the kernel 1041 or the middleware 1043, may include, for example, at least one interface or function (e.g., instructions) for file control, window control, image processing, character control, or the like.

The input/output interface 1050 may serve to transfer an instruction or data input from a user or another external device to (an)other element(s) of the electronic device 1001. Furthermore, the input/output interface 1050 may output instructions or data received from (an)other element(s) of the electronic device 1001 to the user or another external device.

The display 1060 may include, for example, a liquid crystal display (LCD), a light-emitting diode (LED) display, an organic light-emitting diode (OLED) display, a microelectromechanical systems (MEMS) display, or an electronic paper display. The display 1060 may present various content (e.g., a text, an image, a video, an icon, a symbol, or the like) to a user. The display 1060 may include a touch screen, and may receive a touch, a gesture, a proximity or hovering input from an electronic pen or a part of a user's body.

The communication interface 1070 may establish communication between the electronic device 1001 and the first external electronic device 1002, the second external electronic device 1004, or a server 1006. For example, the communication interface 1070 may be connected to a network 1062 via wireless communications or wired communications so as to communicate with the second external electronic device 1004 or the server 1006.

The wireless communications may employ at least one of cellular communication protocols such as long-term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). The wireless communications may include, for example, a short-range communications 1064. The short-range communications may include at least one of wireless fidelity (Wi-Fi), Bluetooth, Bluetooth low energy (BLE), Zigbee, near field communication (NFC), magnetic secure transmission (MST), and global navigation satellite system (GNSS). GNSS may include, for example, at least one of a global positioning system (GPS), another global navigation satellite system (GLONASS), BeiDou navigation satellite system (BeiDou), and Galileo, the European global satellite-based navigation system according to a use area or a bandwidth. Hereinafter, the terms "GPS" and "GNSS" may be used interchangeably.

Wired communications may include at least one of a universal serial bus (USB), a high definition multimedia interface (HDMI), a recommended standard 232 (RS-232), a plain old telephone service (POTS), and the like. The network 1062 may include at least one telecommunications network, for example, a computer network (e.g., a local area network (LAN) or a wide area network (WAN)), the Internet, and/or a telephone network.

The types of the first external electronic device 1002 and the second external electronic device 1004 may be the same as or different from the type of the electronic device 1001. The server 1006 may include one or more servers. A portion or all of the operations performed in the electronic device 1001 may be performed in one or more other electronic devices (e.g., the first electronic device 1002, the second external electronic device 1004, or the server 1006). If the electronic device 1001 performs a certain function or service automatically or in response to a request, the electronic device 1001 may request at least a portion of the functions related to the certain function or service to be performed from another device (e.g., the first electronic device 1002, the second external electronic device 1004, or the server 1006) instead of or in addition to the electronic device 1001 performing the function or service. The other electronic device (e.g., the first electronic device 1002, the second external electronic device 1004, or the server 1006) may perform the requested function or additional function, and may transfer a result of performing the requested function or additional function to the electronic device 1001. The electronic device 1001 may use a received result as is or additionally process the received result to provide the requested function or service. To this end, for example, cloud computing, distributed computing, or client-server computing may be used.

Figure 11:
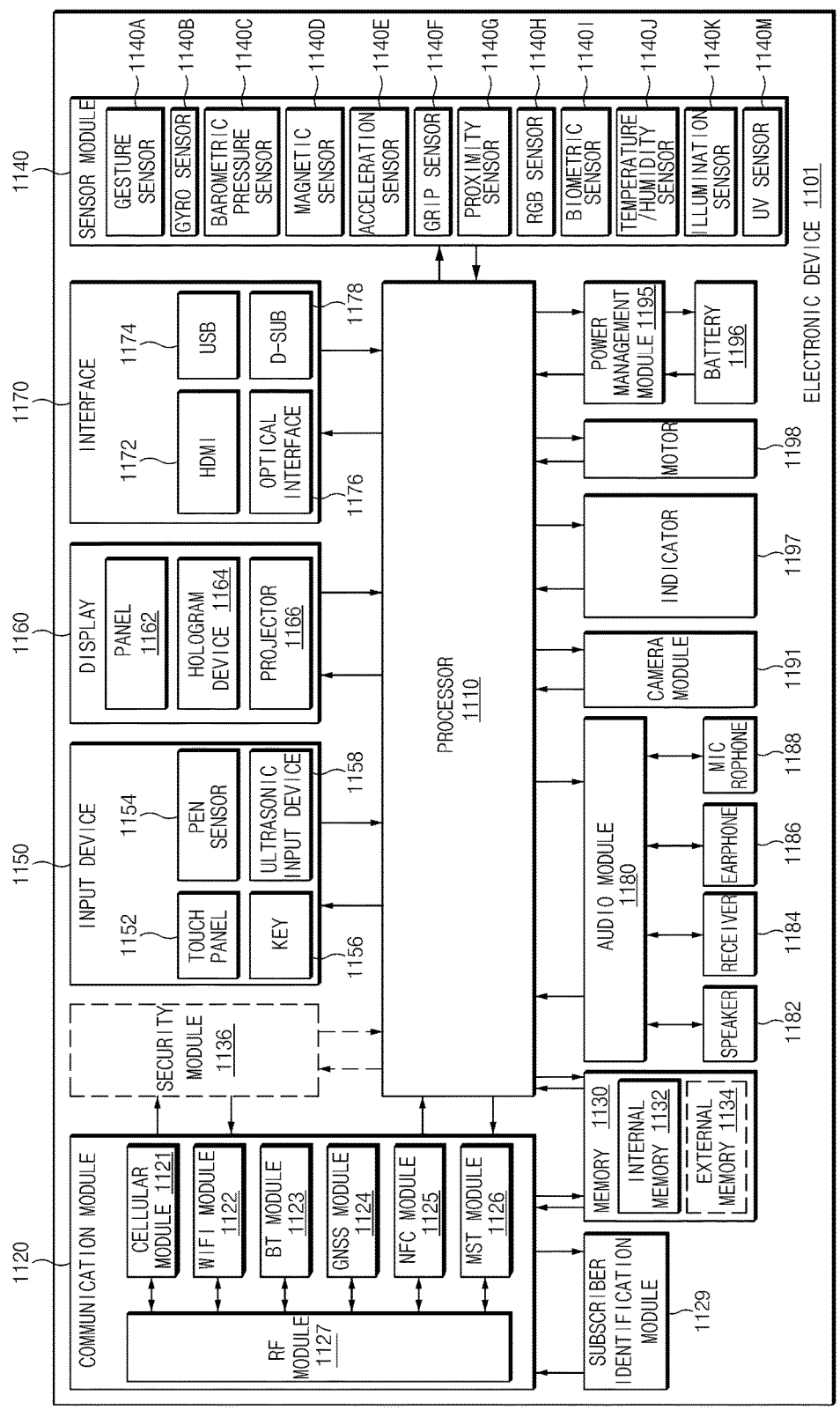
FIG. 11 is a block diagram of an electronic device, according to an embodiment of the present disclosure.

FIG. 11 is a block diagram of an electronic device 1101 according to an embodiment of the present disclosure.

Referring to FIG. 11, the electronic device 1101 may include, for example, a part or the entirety of the electronic device 1001 illustrated in FIG. 10. The electronic device 1101 may include at least one processor (e.g., an AP) 1110, a communication module 1120, a subscriber identification module (SIM) 1129, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may run an operating system or an application program so as to control a plurality of hardware or software elements connected to the processor 1110, process various data, and perform operations. The processor 1110 may be implemented with, for example, a system on chip (SoC). According to an embodiment of the present disclosure, the processor 1110 may further include a GPU and/or an image signal processor. The processor 1110 may include at least a portion of the elements (e.g., a cellular module 1121) illustrated in FIG. 11. The processor 1110 may load, on a volatile memory, an instruction or data received from at least one of the other elements (e.g., a nonvolatile memory) to process the instruction or data, and may store various data in a nonvolatile memory.

The communication module 1120 may be configured the same as or similar to the communication interface 1070 of FIG. 10. The communication module 1120 may include, for example, the cellular module 1121 (e.g., the modem 330), a Wi-Fi module 1122, a Bluetooth (BT) module 1123, a GNSS module 1124 (e.g., a GPS module, a GLONASS module, a BeiDou module, or a Galileo module), an NFC module 1125, a MST module 1126 and a radio frequency (RF) module 1127.

The cellular module 1121 may provide, for example, a voice call service, a video call service, a text message service, or an Internet service through a communication network. The cellular module 1121 may identify and authenticate the electronic device 1101 in the communication network using the subscriber identification module 1129 (e.g., a SIM card). The cellular module 1121 may perform at least a part of the functions that may be provided by the processor 1110. The cellular module 1121 may include a CP.

Each of the Wi-Fi module 1122, the Bluetooth module 1123, the GNSS module 1124, the NFC module 1125 and the MST module 1126 may include, for example, a processor for processing data transmitted/received through the modules. According to an embodiment of the present disclosure, at least a part (e.g., two or more) of the cellular module 1121, the Wi-Fi module 1122, the Bluetooth module 1123, the GNSS module 1124, the NFC module 1125 and the MST module 1126 may be included in a single integrated circuit (IC) or IC package.

The RF module 1127 may transmit/receive, for example, communication signals (e.g., RF signals). The RF module 1127 may include, for example, a transceiver, a power amplifier module (PAM), a frequency filter, a low noise amplifier (LNA), an antenna, or the like. According to an embodiment of the present disclosure, at least one of the cellular module 1121, the Wi-Fi module 1122, the Bluetooth module 1123, the GNSS module 1124, the NFC module 1125 and the MST module 1126 may transmit/receive RF signals through a separate RF module.

The SIM 1129 may include, for example, an embedded SIM and/or a card, and may include unique identification information (e.g., an integrated circuit card identifier (IC-CID)) or subscriber information (e.g., international mobile subscriber identity (IMSI)).

The memory 1130 (e.g., the memory 1030) may include, for example, an internal memory 1132 or an external memory 1134. The internal memory 1132 may include at least one of a volatile memory (e.g., a dynamic random access memory (DRAM), a static RAM (SRAM), a synchronous dynamic RAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, and a solid state drive (SSD).

The external memory 1134 may include a flash drive such as a compact flash (CF) drive, a secure digital (SD) memory card, a micro-SD, a mini-SD memory card, an extreme digital (xD) memory card, a multimedia card (MMC), a memory stick, or the like. The external memory 1134 may be operatively and/or physically connected to the electronic device 1101 through various interfaces.

A security module 1136, which is a module including a storage space that has a higher security level than the memory 1130, may be a circuit for providing secure data storage and a protected execution environment. The security module 1136 may be implemented with an additional circuit and may include an additional processor. The security module 1136 may be present in an attachable smart IC or SD memory card, or may include an embedded secure element (eSE), which is installed in a fixed IC. Additionally, the security module 1136 may be driven in another OS which is different from the OS of the electronic device 1101. For example, the security module 1136 may operate based on a Java card open platform (JCOP) OS.

The sensor module 1140 may, for example, measure a physical quantity or detect an operation state of the electronic device 1101 so as to convert measured or detected information into an electrical signal. The sensor module 1140 may include, for example, at least one of a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 1140H (e.g., a red/green/blue (RGB) sensor), a biometric sensor 1140I, a temperature/humidity sensor 1140J, an illumination sensor 1140K, and an ultraviolet (UV) light sensor 1140M. Additionally or alternatively, the sensor module 1140 may include, for example, an olfactory sensor (e.g., an electronic nose (E-nose) sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1140 may further include a control circuit for controlling at least one sensor included therein. In an embodiment of the present disclosure, the electronic device 1101 may further include a processor configured to control the sensor module 1140 as a part of the processor 1110 or separately, so that the sensor module 1140 is controlled while the processor 1110 is in a reduced power or sleep state.

The input device 1150 may include, for example, a touch panel 1152, a (digital) pen sensor 1154, a key 1156, or an ultrasonic input device 1158. The touch panel 1152 may employ at least one of a capacitive type, a resistive type, an infrared type, and an ultraviolet light type sensing method. The touch panel 1152 may further include a control circuit. The touch panel 1152 may further include a tactile layer so as to provide a haptic feedback to a user.

The (digital) pen sensor 1154 may include, for example, a sheet for recognition which is either a part of a touch panel or is separate. The key 1156 may include, for example, a physical button, an optical button, or a keypad. The ultrasonic input device 1158 may sense ultrasonic waves generated by an input tool through a microphone 1188 so as to identify data corresponding to the ultrasonic waves sensed.

The display 1160 (e.g., the display 1060) may include a panel 1162, a hologram device 1164, and/or a projector 1166. The panel 1162 may be configured the same as or similar to the display 1060 of FIG. 10. The panel 1162 may be, for example, flexible, transparent, or wearable. The panel 1162 and the touch panel 1152 may be integrated into a single module. The hologram device 1164 may display a stereoscopic image in a space using a light interference phenomenon. The projector 1166 may project light onto a screen so as to display an image. The screen may be disposed in internally or externally to the electronic device 1101. According to an embodiment of the present disclosure, the display 1160 may further include a control circuit for controlling the panel 1162, the hologram device 1164, and/or the projector 1166.

The interface 1170 may include, for example, an HDMI 1172, a USB 1174, an optical interface 1176, and/or a D-subminiature (D-sub) connector 1178. The interface 1170, for example, may be included in the communication interface 1070 illustrated in FIG. 10. Additionally or alternatively, the interface 1170 may include, for example, a mobile high-definition link (MHL) interface, an SD card/MMC interface, or an interface according to an Infrared Data Association (IrDA) standard.

The audio module 1180 may convert, for example, a sound into an electrical signal or vice versa. At least a portion of the elements of the audio module 1180 may be included in the input/output interface 1050 illustrated in FIG. 10. The audio module 1180 may process sound information input or output through a speaker 1182, a receiver 1184, an earphone 1186, or the microphone 1188.

The camera module 1191 is, for example, a device for photographing a still image or recording a video. According to an embodiment of the present disclosure, the camera module 1191 may include at least one image sensor (e.g., a front sensor or a rear sensor), a lens, an image signal processor (ISP), or a flash (e.g., an LED lamp or a xenon lamp).

The power management module 1195 may manage power of the electronic device 1101. The power management module 1195 may include a power management integrated circuit (PMIC), a charger IC, a battery, and/or a battery gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1196 and a voltage, current or temperature thereof while the battery 1196 is charging. The battery 1196 may include, for example, a rechargeable battery and/or a solar battery.

The indicator 1197 may display a certain state of the electronic device 1101 or a part thereof (e.g., the processor 1110), such as a booting state, a message state, a charging state, or the like. The motor 1198 may convert an electrical signal into a mechanical vibration, and may generate a vibration or haptic effect. A processing device (e.g., a GPU) for supporting a mobile TV may be included in the electronic device 1101. The processing device for supporting a mobile TV may process media data according to the standards of digital multimedia broadcasting (DMB), digital video broadcasting (DVB), MediaFLO™, or the like.

Figure 12:
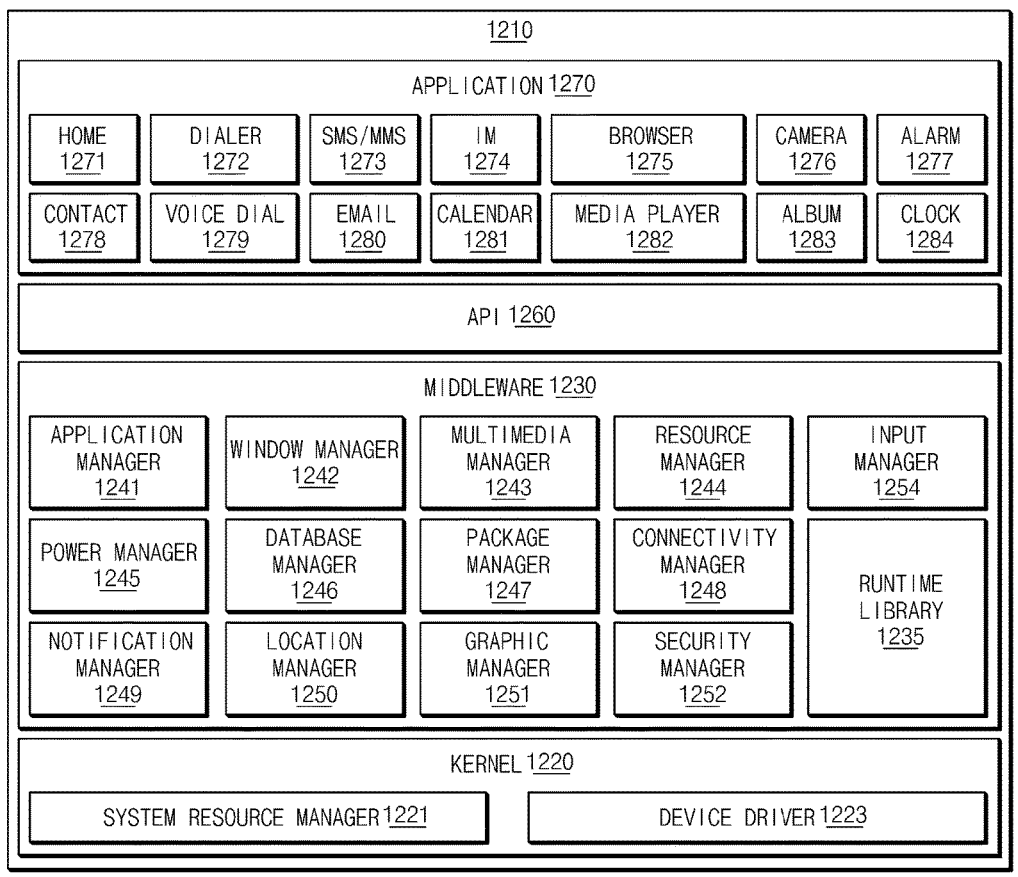
FIG. 12 is a block diagram of a program module, according to an embodiment of the present disclosure.

FIG. 12 is a block diagram of a program module according to an embodiment of the present disclosure.

Referring to FIG. 12, a program module 1210 (e.g., the program 1040) may include an OS for controlling a resource related to an electronic device (e.g., the electronic device 1001) and/or various applications (e.g., the application program 1047) running on the OS. The OS may be, for example, Android®, iOS®, Windows®, Symbian®, Tizen®, or the like.

The program module 1210 may include a kernel 1220, a middleware 1230, an API 1260, and/or an application 1270. At least a part of the program module 1210 may be preloaded on an electronic device or may be downloaded from an external electronic device (e.g., the first electronic device 1002, the second external electronic device 1004, or the server 1006).

The kernel 1220 (e.g., the kernel 1041) may include, for example, a system resource manager 1221 or a device driver 1223. The system resource manager 1221 may perform control, allocation, or retrieval of a system resource. According to an embodiment of the present disclosure, the system resource manager 1221 may include a process management unit, a memory management unit, a file system management unit, or the like. The device driver 1223 may include, for example, a display driver, a camera driver, a Bluetooth driver, a shared memory driver, a USB driver, a keypad driver, a Wi-Fi driver, an audio driver, or an inter-process communication (IPC) driver.

The middleware 1230, for example, may provide a function that the application 1270 requires in common, or may provide various functions to the application 1270 through the API 1260 so that the application 1270 may efficiently use limited system resources in the electronic device. The middleware 1230 (e.g., the middleware 1043) may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, a security manager 1252 and an input manager 1254.

The runtime library 1235 may include, for example, a library module that a complier uses to add a new function through a programming language while the application 1270 is running. The runtime library 1235 may perform a function for input/output management, memory management, or an arithmetic function.

The application manager 1241 may mange, for example, a life cycle of at least one of the application 1270. The window manager 1242 may manage a graphical user interface (GUI) resource used in a screen. The multimedia manager 1243 may recognize a format required for playing various media files and may encode or decode a media file using a codec matched to the format. The resource manager 1244 may manage a resource such as source code, a memory, or a storage space of at least one of the applications in the application 1270.

The power manager 1245, for example, may operate together with a basic input/output system (BIOS) to manage a battery or power and may provide power information required for operating an electronic device. The database manager 1246 may generate, search, or modify a database to be used in at least one of the applications of the application 1270. The package manager 1247 may manage installation or update of an application distributed in a package file format.

The connectivity manger 1248 may manage a wireless connection of Wi-Fi, Bluetooth, or the like. The notification manager 1249 may display or notify an event such as message arrival, appointments, and proximity alerts in such a manner as not to disturb a user. The location manager 1250 may manage location information of the electronic device. The graphic manager 1251 may manage a graphic effect to be provided to a user or a user interface related thereto. The security manager 1252 may provide various security functions required for system security or user authentication. The input manager 1254 (e.g., the input manager 15) may process data regarding a user input and transfer the data to an application. According to an embodiment of the present disclosure, in the case in which an electronic device (e.g., the electronic device 1001) includes a phone function, the middleware 1230 may further include a telephony manager for managing a voice or video call function of the electronic device.

The middleware 1230 may include a middleware module for forming a combination of various functions of the above-mentioned elements. The middleware 1230 may provide a module specialized for each type of an operating system to provide differentiated functions. Furthermore, the middleware 1230 may delete a part of existing elements or may add new elements dynamically.

The API 1260 (e.g., the API 1045) which is, for example, a set of API programming functions may be provided in different configurations according to an operating system. For example, in the case of Android® or iOS®, one API set may be provided for each platform, and, in the case of Tizen®, at least two API sets may be provided for each platform.

The application 1270 (e.g., the application program 1047), for example, may include at least one application capable of performing functions such as a home application 1271, a dialer application 1272, an SMS/MMS application 1273, an instant message application (IM) 1274, a browser application 1275, a camera application 1276, an alarm application 1277, a contact application 1278, a voice dial application 1279, an e-mail application 1280, a calendar application 1281, a media player application 1282, an album application 1283, a clock application 1284. The application 1270 may also include a health care application (e.g., an application to measure an exercise amount or a blood sugar level), or an environmental information provision application (e.g., an application to provide air pressure, humidity, or temperature information).

The application 1270 may include an information exchange application for supporting information exchange between the electronic device (e.g., the electronic device 1001) and the first electronic device 1002 or the second external electronic device 1004. The information exchange application may include, for example, a notification relay application for relaying certain information to an external electronic device or a device management application for managing the external electronic device.

For example, the notification relay application may have a function for relaying, to the first electronic device 1002 or the second external electronic device 1004, notification information generated in another application (e.g., the SMS/MMS application 1273, the e-mail application 1280, the health care application, the environmental information provision application, or the like) of an electronic device. Furthermore, the notification relay application may receive notification information from an external electronic device and may provide the received notification information to a user.

The device management application, for example, may manage (e.g., install, delete, or update) at least one function (e.g., turn-on/turn off of an external electronic device (or some elements) or the brightness (or resolution) adjustment of a display) of the first electronic device 1002 or the second external electronic device 1004 communicating with an electronic device, an application running in the external electronic device, or a service (e.g., a call service, a message service, or the like) provided from the external electronic device.

The application 1270 may include a certain application (e.g., a healthcare application of a mobile medical device) according to an attribute of the first electronic device 1002 or the second external electronic device 1004. The application 1270 may include an application received from the first electronic device 1002 or the second external electronic device 1004. The application 1270 may include a preloaded application or a third-party application downloadable from a server. The names of the elements of the program module 1210 illustrated may vary with the type of an operating system.

At least a part of the program module 1210 may be implemented with software, firmware, hardware, or a combination thereof. At least a part of the program module 1210, for example, may be implemented (e.g., executed) by a processor (e.g., the processor 1020). At least a part of the program module 1210 may include, for example, a module, a program, a routine, sets of instructions, or a process for performing at least one function.

Each of the elements described herein may be configured with one or more components, and the names of the elements may be changed according to the type of an electronic device. In an embodiment of the present disclosure, an electronic device may include at least one of the elements described herein, and some elements may be omitted or other additional elements may be added. Further, some of the elements of an electronic device may be combined with each other so as to form one entity, so that the functions of the elements may be performed in the same manner as before the combination.

The term "module" used herein may represent, for example, a unit including one of hardware, software, firmware, and a combination thereof. The term "module" may be interchangeably used with the terms "unit," "logic," "logical block," "component" and "circuit." The term "module" may indicate a minimum unit of an integrated component or may indicate a part thereof. The term "module" may indicate a minimum unit for performing one or more functions or a part thereof. The term "module" may indicate a unit that may be implemented mechanically or electronically. For example, the term "module" may indicate a unit that includes at least one of an application-specific integrated circuit (ASIC), a field-programmable gate array (FPGA), and a programmable-logic device for performing some operations, which are known or will be developed.

At least a part of devices (e.g., modules or functions thereof) or methods (e.g., operations) according to an embodiment of the present disclosure may be implemented as instructions stored in a non-transitory computer-readable recording medium in the form of a program module. In the case where instructions are performed by a processor (e.g., the processor 1020), the processor may perform functions corresponding to the instructions. The non-transitory computer-readable recording medium may be, for example, the memory 130.

A non-transitory computer-readable recording medium may include a hard disk, a floppy disk, a magnetic medium (e.g., a magnetic tape), an optical medium (e.g., a compact disc ROM (CD-ROM), a digital versatile disc (DVD)), a magneto-optical medium (e.g., a floptical disk), or a hardware device (e.g., a ROM, a RAM, a flash memory, or the like). Program instructions may include machine language code generated by compilers and high-level language code that can be executed by computers using interpreters. The above-mentioned hardware device may be configured to be operated as one or more software modules for performing operations of an embodiment of the present disclosure and vice versa.

A module or a program module according to an embodiment of the present disclosure may include at least one of the above-mentioned elements, or some elements may be omitted or other additional elements may be added. Operations performed by a module, a program module or other elements according to an embodiment of the present disclosure may be performed in a sequential, parallel, iterative or heuristic way. Furthermore, some operations may be performed in another order or may be omitted, or other operations may be added.

According to various embodiments of the present disclosure, the reaction speed or the accuracy of the touch manipulation of a user may be improved, thereby providing the user with an excellent user experience. According to various embodiments of the present disclosure, power consumed to drive an input panel may be reduced.

While the present disclosure has been shown and described with reference to certain embodiments thereof, it will be understood by those skilled in the art that various changes in form and details may be made therein without departing from the scope and spirit of the present disclosure. Therefore, the scope of the present disclosure should not be defined as being limited to the embodiments described herein, but are defined by the appended claims and equivalents thereof.

What is claimed is:

1. An electronic device, comprising:
   a display;
   an input panel configured to periodically sense touch coordinates corresponding to a touch manipulation of a user; and
   a processor configured to periodically receive the touch coordinates from the input panel, calculate a variation of the touch coordinates based on the touch coordinates, determine resampling coordinates of the touch coordinates based on an update period of the display, to determine whether the touch manipulation moves, based on the variation of the touch coordinates, and perform a function corresponding to the determination whether the touch manipulation moves based on the resampling coordinates.

2. The electronic device of claim 1, wherein the processor is further configured to:
   determine that the touch manipulation moves, if the variation of the touch coordinates is greater than or equal to a pre-determined reference value; and
   determine that the touch manipulation stopped, if the variation of the touch coordinates is less than the pre-determined reference value.

3. The electronic device of claim 2, wherein the processor is further configured to change the pre-determined reference value by using the variation of the touch coordinates.

4. The electronic device of claim 1, wherein the touch coordinates comprise an x-axis coordinate and a y-axis coordinate corresponding to the touch manipulation, and
   wherein the processor is further configured to:
   calculate a variation of each of the x-axis coordinate and the y-axis coordinate; and
   determine that the touch manipulation moves, if at least one of the variation of the x-axis coordinate and the variation of the y-axis coordinate is greater than or equal to a pre-determined reference value.

5. The electronic device of claim 1, wherein the touch coordinates comprise an x-axis coordinate and a y-axis coordinate corresponding to the touch manipulation, and
   wherein the processor is further configured to:
   calculate a variation of each of the x-axis coordinate and the y-axis coordinate and
   determine resampling coordinates based on each of the x-axis coordinate and the y-axis coordinate.

6. An input processing method of an electronic device, the method comprising:
   periodically sensing touch coordinates corresponding to a touch manipulation of a user;
   calculating a variation of the touch coordinates based on the touch coordinates;
   changing a reference value for determining movement of the touch manipulation by using the variation of the touch coordinates; and
   determining whether the touch manipulation moves, based on the reference value.

7. The method of claim 6, wherein changing the reference value comprises:
   changing the reference value to the variation of the touch coordinates if the variation of the touch coordinates is less than the reference value.

8. The method of claim 6, wherein the changing of the reference value comprises:
   changing the reference value in a pre-determined range, and
   wherein the pre-determined range is proportional to a pixel density.

9. The method of claim 6, further comprising:
   determining a touch event corresponding to the touch coordinates,
   wherein changing the reference value comprises:
   counting a number of occurrences of a touch move event in the touch event, and
   changing the reference value if the number of occurrences of the touch move event in the touch event is greater than or equal to a pre-determined number of times.

10. The method of claim 9, wherein changing the reference value further comprises:
    initializing the number of occurrences of the touch move event in the touch event if a touch down event or a touch up event is received from an input panel or if the reference value is changed.

11. The method of claim 6, wherein determining whether the touch manipulation moves comprises:
    determining that the touch manipulation moves, if the variation of the touch coordinates is greater than or equal to the reference value, and
    determining that the touch manipulation stopped, if the variation of the touch coordinates is less than the reference value.

12. The method of claim 6, wherein the touch coordinates comprise an x-axis coordinate and a y-axis coordinate corresponding to the touch manipulation, and
    wherein determining whether the touch manipulation moves comprises:
    calculating a variation of each of the x-axis coordinate and the y-axis coordinate; and
    determining that the touch manipulation moves, if at least one of the variation of the x-axis coordinate and the variation of the y-axis coordinate is greater than or equal to the reference value.

13. The method of claim 6, wherein the touch coordinates comprise an x-axis coordinate and a y-axis coordinate corresponding to the touch manipulation, and
    wherein determining whether the touch manipulation moves comprises:
    calculating a variation of each of the x-axis coordinate and the y-axis coordinate; and
    determining resampling coordinates based on each of the x-axis coordinate and the y-axis coordinate.

14. An electronic device, comprising:
    an input panel configured to periodically sense touch coordinates corresponding to a touch manipulation of a user; and
    a processor configured to periodically receive the touch coordinates from the input panel, calculate a variation of the touch coordinates based on the touch coordinates, change a reference value for determining movement of the touch manipulation based on the variation of the touch coordinates, and determine whether the touch manipulation moves, based on the reference value.

15. The electronic device of claim 14, wherein the processor is further configured to change the reference value to the variation of the touch coordinates if the variation of the touch coordinates is less than the reference value.

16. The electronic device of claim 14, wherein the processor is further configured to change the reference value in a pre-determined range, and
   wherein the pre-determined range is proportional to a pixel density.

17. The electronic device of claim 14, wherein the processor is further configured to:
   determine a touch event corresponding to the touch coordinates;
   count a number of times that a touch move event in the touch event is received; and
   change the reference value if the number of times that the touch move event in the touch event is received is greater than or equal to a pre-determined number of times.

18. The electronic device of claim 17, wherein the processor is further configured to initialize the number of times that the touch move event in the touch event is received, if a touch down event or a touch up event is received from the input panel or if the reference value is changed.

19. The electronic device of claim 14, wherein the processor is further configured to determine that the touch manipulation moves, if the variation of the touch coordinates is greater than or equal to the reference value, and
   determine that the touch manipulation stopped, if the variation of the touch coordinates is less than the reference value.

20. The electronic device of claim 14, wherein the touch coordinates comprise an x-axis coordinate and a y-axis coordinate corresponding to the touch manipulation, and
   wherein the processor is further configured to:
   calculate a variation of each of the x-axis coordinate and the y-axis coordinate; and
   determine that the touch manipulation moves, if at least one of the variation of the x-axis coordinate and the variation of the y-axis coordinate is greater than or equal to the reference value.

* * * * *